US012664840B2

(12) United States Patent
Marcinkowski et al.

(10) Patent No.: US 12,664,840 B2
(45) Date of Patent: Jun. 23, 2026

(54) SMART THERMOSTAT HUB WITH PRIVATE AND PUBLIC NETWORK SUPPORT

(71) Applicant: EDST, LLC, Lubbock, TX (US)

(72) Inventors: Dave Marcinkowski, Lubbock, TX (US); Thomas Mandry, Lubbock, TX (US); Shawn Massie, Lubbock, TX (US); David Gilles, Lubbock, TX (US); Larry Lafreniere, Lubbock, TX (US); Tray Johnson, Lubbock, TX (US)

(73) Assignee: EDST, LLC, Lubbock, TX (US)

( * ) Notice: Subject to any disclaimer, the term of this patent is extended or adjusted under 35 U.S.C. 154(b) by 0 days.

(21) Appl. No.: 18/515,527

(22) Filed: Nov. 21, 2023

(65) Prior Publication Data

US 2024/0087382 A1      Mar. 14, 2024

Related U.S. Application Data

(63) Continuation-in-part of application No. 17/512,577, filed on Oct. 27, 2021, now Pat. No. 12,080,115,
(Continued)

(51) Int. Cl.
  *H04L 12/28*          (2006.01)
  *G06F 3/0484*         (2022.01)
  (Continued)

(52) U.S. Cl.
  CPC ....... *G07C 9/00182* (2013.01); *G06F 3/0484* (2013.01); *G07C 9/00904* (2013.01);
  (Continued)

(58) Field of Classification Search
  CPC .. H05B 47/19; H05B 47/196; H05B 47/1965; H04W 12/04; H04W 12/50; H04W 4/80;
  (Continued)

(56) References Cited

U.S. PATENT DOCUMENTS

| | | | |
|---|---|---|---|
| 9,057,210 B2 | 6/2015 | Dumas et al. | |
| 9,478,084 B1 | 10/2016 | Robinson | |

(Continued)

FOREIGN PATENT DOCUMENTS

| | | |
|---|---|---|
| EP | 0533507 A1 | 3/1993 |
| EP | 2941844 A1 | 11/2015 |

(Continued)

OTHER PUBLICATIONS

International Search Report and Written Opinion issued for PCT Application No. PCT/IB2019/057876, dated Dec. 10, 2019, 30 pages.

(Continued)

*Primary Examiner* — Dionne Pendleton
(74) *Attorney, Agent, or Firm* — Norton Rose Fulbright US LLP

(57)           ABSTRACT

Systems and methods for managing smart devices associated with a multi-family residential property are disclosed. Control or management of smart devices may be provided by a smart thermostat hub that includes one or more processors and a memory coupled to the one or more processors. The smart thermostat hub also includes a first communication interface configured to communicatively couple the smart thermostat hub to a low-power, wide area network (LP-WAN) communication link and a second communication interface configured to communicatively couple the smart thermostat hub to a wireless network via a wireless communication link. The wireless network is communicatively coupled to a set of one or more smart devices. The one or more processors are configured to initialize a connection between the second communication interface and the property management platform via the second communication interface.

20 Claims, 16 Drawing Sheets

Related U.S. Application Data which is a continuation of application No. 16/912,370, filed on Jun. 25, 2020, now Pat. No. 11,189,118, which is a continuation of application No. 16/162,262, filed on Oct. 16, 2018, now Pat. No. 10,825,273.

(51) Int. Cl.
*G07C 9/00* (2020.01)
*H04W 12/04* (2021.01)

(52) U.S. Cl.
CPC ........... *H04L 12/283* (2013.01); *H04W 12/04* (2013.01); *G07C 2009/00198* (2013.01); *G07C 9/00309* (2013.01); *G07C 2009/00333* (2013.01); *G07C 2009/00357* (2013.01); *G07C 2009/00507* (2013.01); *G07C 2009/00769* (2013.01); *G07C 2009/00825* (2013.01)

(58) Field of Classification Search
CPC . H04W 12/06; H04W 12/069; H04W 12/033; H04W 12/47; H04W 12/02; H04W 12/0431; H04W 12/0471; H04W 12/35; H04W 12/61; H04W 12/71; H04W 4/021; H04W 4/023; H04W 4/029; H04W 4/06; H04W 4/44; H04W 76/11; H04W 76/14; H04W 84/18; H04W 12/08; H04W 12/10; H04W 12/30; H04W 12/75; H04W 4/20; H04W 4/40; H04W 8/005; H04W 8/06; H04W 88/02; H04L 12/283; H04L 12/2832; H04L 2012/2841; H04L 9/3234; H04L 9/3297; H04L 63/0861; H04L 9/0825; H04L 9/0869; H04L 9/088; H04L 9/3247; H04L 67/12; H04L 9/0822; H04L 63/06; H04L 63/083; H04L 63/0846; H04L 63/0884; H04L 63/123; H04L 9/0894; H04L 9/12; H04L 9/3213; H04L 2209/80; H04L 2209/805; H04L 2463/062; H04L 63/0428; H04L 63/0478; H04L 63/061; H04L 63/062; H04L 63/068; H04L 63/0853; H04L 63/0876; H04L 63/104; H04L 63/12; H04L 67/10; H04L 67/141; H04L 9/0637; H04L 9/083; H04L 9/0863; H04L 9/0866; H04L 9/32; H04L 9/3228; H04L 9/3239; H04L 9/50; G07C 2009/00198; G07C 2009/00333; G07C 2009/00357; G07C 2009/00507; G07C 2009/00769; G07C 2009/00825; G07C 9/00182; G07C 9/00309; G07C 9/00571; G07C 9/00904; G07C 2209/08; G07C 9/00857; G07C 2009/00793; G07C 2009/00865; G07C 2009/00436; G07C 9/21; G07C 9/0069; G07C 2009/00404; G07C 2009/00412; G07C 9/00563; G07C 9/27; G07C 9/00722; G07C 9/00896; G07C 9/257; G07C 2009/00388; G07C 2209/63; G07C 2009/00325; G07C 2009/00523; G07C 2009/00634; G07C 5/008; G07C 9/00174; G07C 9/20; G07C 9/31; G07C 2009/00269; G07C 2009/00293; G07C 2009/00476; G07C 2009/00841; G07C 2009/00936; G07C 2009/00952; G07C 2209/02; G07C 2209/04; G07C 2209/62; G07C 9/00817; G07C 9/00944; G07C 9/28; G05B 15/02; G05B 2219/2642; G06F 3/0484; G06F 3/04847; G06F 21/34; G06F 21/31; G06F 21/32; G06F 8/65; G06F 13/10; G06F 1/163; G06F 15/177; G06F 21/575; G06F 21/606; G06F 8/71; G07F 17/14; G06K 7/087; G06K 7/10366; F24F 11/58; G06Q 20/40145; G06Q 20/352; G06Q 20/357; G06Q 20/204; G06Q 20/209; G06Q 20/306; G06Q 20/308; G06Q 20/321; G06Q 20/326; G06Q 20/327; G06Q 20/3674; G06Q 20/3821; G06Q 2240/00; G06Q 30/04; G06Q 40/02; B60R 2325/205; B60R 25/24; B60R 25/241; B60R 25/00; B60R 25/25; B60R 25/252; B60R 25/255; G07B 15/02; E05B 2047/0058; E05B 2047/0062; E05B 47/026; E05B 47/06; E05B 47/0676; E05B 19/0005; E05B 19/0082; E05B 2047/0095; E05B 2047/0096; E05B 67/02; H04B 10/1141; H04B 10/1149; H04B 1/3888; H04M 1/72412; H04M 1/21; G01S 5/0027; G01S 5/0036; G01S 5/0054; G01S 5/16; A61B 5/01; A61B 5/02055; A61B 5/11; A61B 5/6826; A61B 5/7435; A61B 5/746; G06T 2207/30244; G06T 2207/30264; G06T 7/70; G08B 13/1427; G08B 21/0263; G08B 21/24; G08B 7/06; H05K 1/0271; H05K 2201/09018; H05K 2201/10098; H05K 2201/10106; H05K 2201/10151; H05K 3/284; H05K 3/36; G08G 1/205; Y02D 30/70; Y02T 10/92

See application file for complete search history.

(56) References Cited

U.S. PATENT DOCUMENTS

| | | | |
|---|---|---|---|
| 9,666,000 B1 | | 5/2017 | Schoenfelder et al. |
| 9,875,647 B1 | | 1/2018 | Tannenbaum et al. |
| 10,313,303 B2 | | 6/2019 | Baum et al. |
| 10,530,598 B2 * | | 1/2020 | Ansari ............... H04L 63/0876 |
| 11,162,698 B2 | | 11/2021 | Ajax et al. |
| 11,164,435 B1 | | 11/2021 | Skeoch |
| 11,189,118 B2 | | 11/2021 | Marcinkowski et al. |
| 11,349,707 B1 | | 5/2022 | Gerstberger et al. |
| 11,381,784 B1 | | 7/2022 | Siminoff |
| 2005/0210283 A1 | | 9/2005 | Kato |
| 2010/0283579 A1 | | 11/2010 | Kraus et al. |
| 2012/0179802 A1 | | 7/2012 | Narasimhan et al. |
| 2013/0305319 A1 | | 11/2013 | Matthews, III et al. |
| 2014/0267740 A1 | | 9/2014 | Almomani et al. |
| 2015/0276254 A1 | | 10/2015 | Nemcek et al. |
| 2015/0287256 A1 | | 10/2015 | Davis |
| 2016/0005247 A1 | | 1/2016 | Mehl et al. |
| 2016/0124401 A1 | | 5/2016 | Li |
| 2016/0239001 A1 | | 8/2016 | Chin et al. |
| 2016/0327921 A1 | | 11/2016 | Ribbich et al. |
| 2016/0330565 A1 | | 11/2016 | Jayaram et al. |
| 2016/0364114 A1 | | 12/2016 | Von Dehsen et al. |
| 2017/0046893 A1 | | 2/2017 | Tseng et al. |
| 2017/0185278 A1 | | 6/2017 | Sundermeyer et al. |
| 2017/0257257 A1 | | 9/2017 | Dawes et al. |
| 2017/0295514 A1 | | 10/2017 | Uchida et al. |
| 2017/0301165 A1 | | 10/2017 | GrandPre et al. |
| 2018/0063150 A1 * | | 3/2018 | Rovito .................. G05B 15/02 |
| 2018/0091930 A1 | | 3/2018 | Jefferies |
| 2018/0110093 A1 | | 4/2018 | Deros et al. |
| 2018/0182191 A1 | | 6/2018 | Wagstaff |
| 2018/0234489 A1 | | 8/2018 | Hammons et al. |
| 2018/0350170 A1 | | 12/2018 | Wang et al. |
| 2019/0043289 A1 | | 2/2019 | Cahill |
| 2019/0190992 A1 | | 6/2019 | Warrick |
| 2019/0327128 A1 * | | 10/2019 | Harpole ................. H04L 45/28 |
| 2019/0371096 A1 | | 12/2019 | Fisher |

(56)  References Cited

U.S. PATENT DOCUMENTS

| | | | |
|---|---|---|---|
| 2020/0028732 A1 | 1/2020 | Akagami | |
| 2020/0090441 A1 | 3/2020 | Kuenzi | |
| 2020/0107402 A1* | 4/2020 | Di Girolamo | H04W 88/16 |
| 2020/0118370 A1 | 4/2020 | Marcinkowski et al. | |
| 2020/0118371 A1 | 4/2020 | Marcinkowski et al. | |
| 2020/0242863 A1 | 7/2020 | Chang et al. | |
| 2021/0142601 A1 | 5/2021 | Schoenfelder et al. | |
| 2021/0319639 A1 | 10/2021 | Ho et al. | |
| 2021/0320875 A1 | 10/2021 | Guim Bernat et al. | |
| 2021/0407234 A1 | 12/2021 | Li et al. | |
| 2021/0409243 A1 | 12/2021 | Yang et al. | |
| 2021/0410116 A1 | 12/2021 | Zhang et al. | |
| 2022/0130189 A1 | 4/2022 | Marcinkowski et al. | |
| 2022/0302575 A1 | 9/2022 | Bank et al. | |
| 2023/0065085 A1 | 3/2023 | Ben Hamozeg et al. | |
| 2023/0263393 A1 | 8/2023 | Ray et al. | |

FOREIGN PATENT DOCUMENTS

| | | | |
|---|---|---|---|
| EP | 3107073 A1 | 12/2016 | |
| WO | WO-2014107196 A1 | 7/2014 | |

OTHER PUBLICATIONS

European Patent Office, Communication, Extended European Search Report issued for European Patent Application No. 19872494.0, dated Nov. 12, 2021, 7 pages.

Joe Miragliotta "Kwikset Kevo Now Works With Nest," Kwikset Locks: Smart Security Blog, Feb. 9, 2015, https://www.smartsecurityblog.com/kevo-smart-lock-nest-learning-thermostat/, 3 pages.

Michael McCole "How to Make Nest's Thermostat Your Smart-Home Hub," Wired, Feb. 10, 2016, https://www.wired.com/2016/02/iotcookbook-nest/, 9 pages.

United States Patent and Trademark Office, Patent Trial and Appeal Board, *Iapartments, Inc.* v. *EDST LLC*, IPR-2022-01468, U.S. Pat. No. 10,825,273, Termination Due to Settlement After Institution of Trial, dated May 2, 2023, 5 pages.

United States Patent and Trademark Office, Patent Trial and Appeal Board, *Iapartments, Inc.* v. *EDST LLC*, IPR-2022-01469, U.S. Pat. No. 10,803,685, Termination Due to Settlement After Institution of Trial, dated May 2, 2023, 5 pages.

United States Patent and Trademark Office, Patent Trial and Appeal Board, *Iapartments, Inc.* v. *EDST LLC*, PGR 2022-00059, U.S. Pat. No. 11,189,118, Termination Due to Settlement After Institution of Trial, dated May 2, 2023, 5 pages.

European Patent Office, Communication, Extended European Search Report issued for European Patent Application No. 23215303.1, dated Mar. 7, 2024, 10 pages.

Patent Cooperation Treaty, International Search Report and Written Opinion issued for PCT Application No. PCT/US2024/031998, dated Sep. 30, 2024, 8 pages.

* cited by examiner

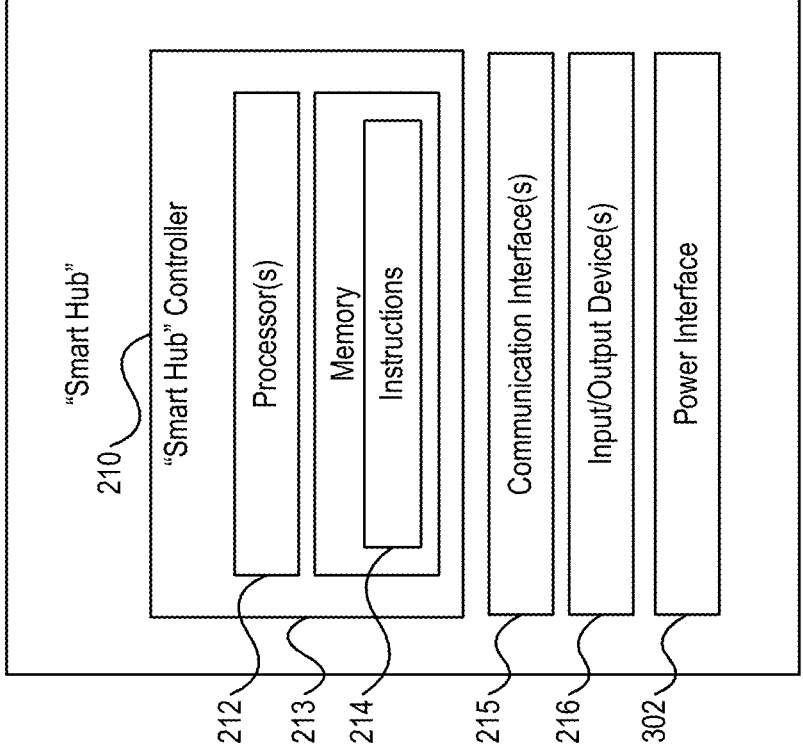
FIG. 3

800

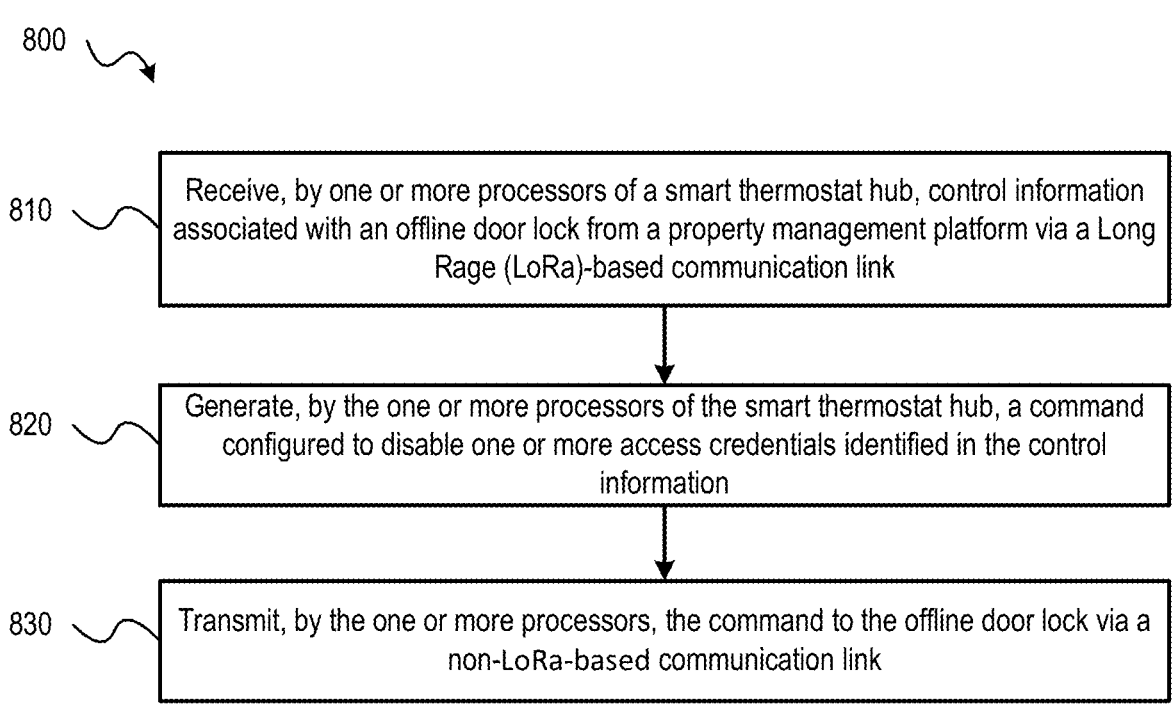

810    Receive, by one or more processors of a smart thermostat hub, control information associated with an offline door lock from a property management platform via a Long Rage (LoRa)-based communication link 820    Generate, by the one or more processors of the smart thermostat hub, a command configured to disable one or more access credentials identified in the control information 830    Transmit, by the one or more processors, the command to the offline door lock via a non-LoRa-based communication link

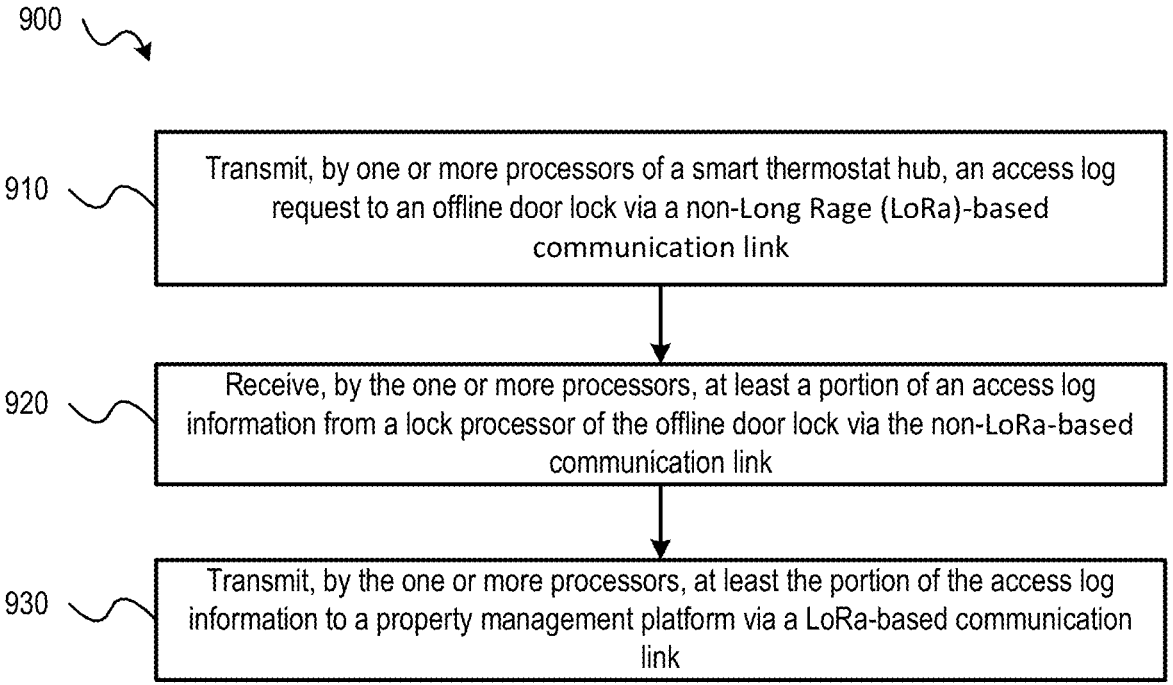

910    Transmit, by one or more processors of a smart thermostat hub, an access log request to an offline door lock via a non-Long Rage (LoRa)-based communication link 920    Receive, by the one or more processors, at least a portion of an access log information from a lock processor of the offline door lock via the non-LoRa-based communication link 930    Transmit, by the one or more processors, at least the portion of the access log information to a property management platform via a LoRa-based communication link

Figures 10, 11:
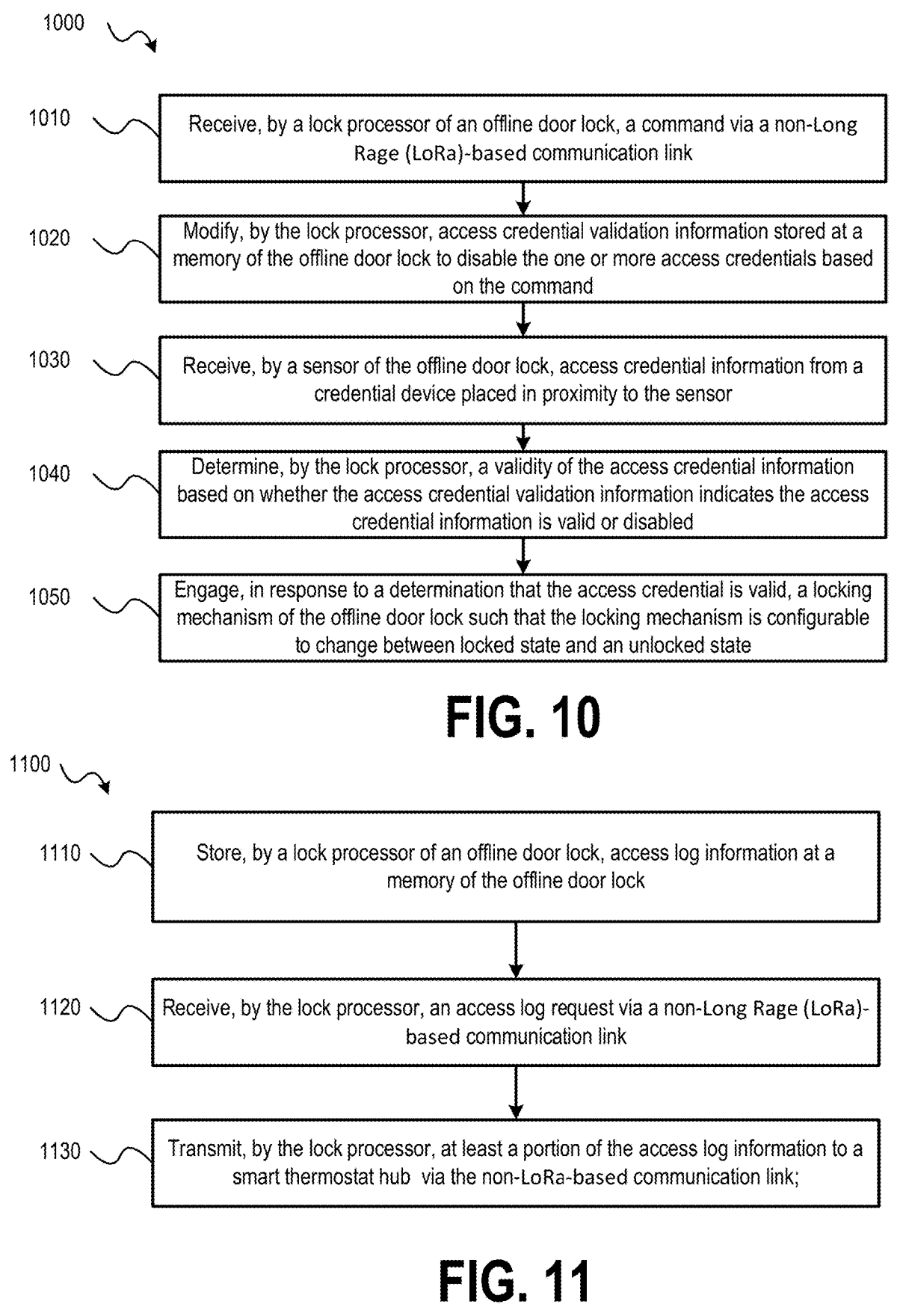

| 1010 | Receive, by a lock processor of an offline door lock, a command via a non-Long Rage (LoRa)-based communication link |

| 1020 | Modify, by the lock processor, access credential validation information stored at a memory of the offline door lock to disable the one or more access credentials based on the command |

| 1030 | Receive, by a sensor of the offline door lock, access credential information from a credential device placed in proximity to the sensor |

| 1040 | Determine, by the lock processor, a validity of the access credential information based on whether the access credential validation information indicates the access credential information is valid or disabled |

| 1050 | Engage, in response to a determination that the access credential is valid, a locking mechanism of the offline door lock such that the locking mechanism is configurable to change between locked state and an unlocked state |

| 1110 | Store, by a lock processor of an offline door lock, access log information at a memory of the offline door lock |

| 1120 | Receive, by the lock processor, an access log request via a non-Long Rage (LoRa)-based communication link |

| 1130 | Transmit, by the lock processor, at least a portion of the access log information to a smart thermostat hub  via the non-LoRa-based communication link; |

My Smart Home

1714

1712

1710

75°

A/C

1720

Lock    Unlock

1730

On    Off

Other Network Devices

1740

My Network Settings

1750

1800

Property Management Home

Property Selection

1810

The Lofts: Downtown

Unit Selection

1820

Unit D (2nd Floor)

Device Controls

75°    1830

A/C

Lock ⬤ Unlock

On ⬤ Off

Additional Settings

Access Credentials

Anna (#&$2*4)

Bob (!7#01$)

1840

Charlie (%5x$-!)

Configure Credentials

Reconfigure for Moveout

1850

Reset

1900

1910

Receive, by one or more processors of a smart thermostat hub, an initialization instruction from a property management platform via a low-power, wide area network (LPWAN) communication link

1920

Initialize, by the one or more processors and based on the initialization instruction, a connection between the smart thermostat hub and the property management platform via a first wireless network communicatively coupled to the smart thermostat hub via a first wireless communication link, the first wireless network located at the unit and communicatively coupled to a first set of one or more smart devices

1930

Receive, by the one or more processors, control information from the property management platform via the first wireless network, the control information associated with a smart device of the first set of one or more smart devices

1940

Transmit, by the one or more processors, a command that is based on the control information to the smart device via the first wireless network

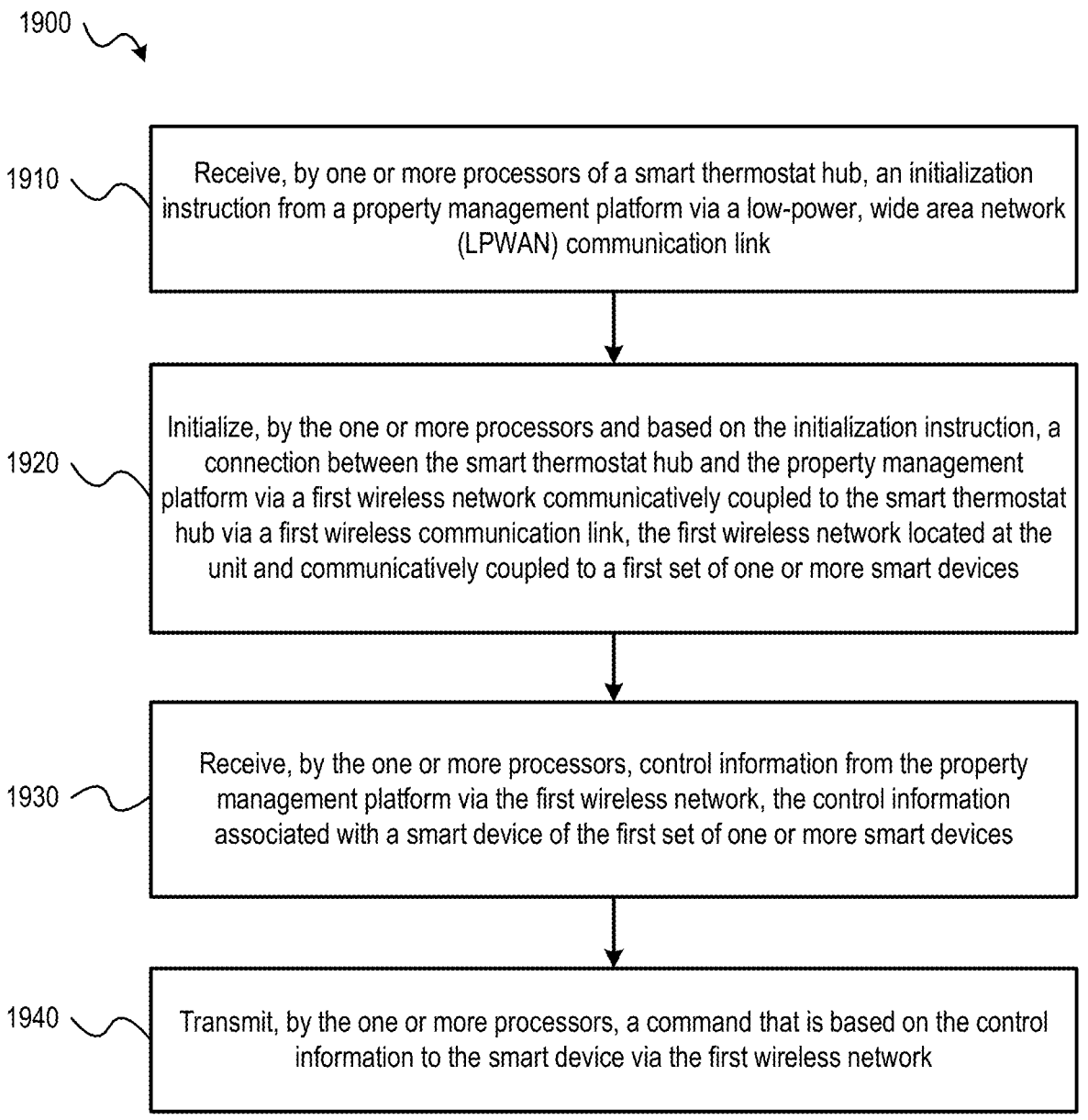

FIG. 19

SMART THERMOSTAT HUB WITH PRIVATE AND PUBLIC NETWORK SUPPORT

CROSS-REFERENCE TO RELATED APPLICATIONS

The present application is a continuation-in-part of U.S. patent application Ser. No. 17/512,577, filed on Oct. 27, 2021, entitled "SMART THERMOSTAT HUB"; which is a continuation of U.S. patent application Ser. No. 16/912,370, filed on Jun. 25, 2020 and issued as U.S. Pat. No. 11,189,118 on Nov. 30, 2021, entitled "SMART THERMOSTAT HUB"; which is a continuation of U.S. patent application Ser. No. 16/162,262, filed on Oct. 16, 2018 and issued as U.S. Pat. No. 10,825,273 on Nov. 3, 2020, entitled "SMART THER-MOSTAT HUB"; the disclosures of which are incorporated by reference herein in their entirety.

TECHNICAL FIELD

The present disclosure is directed to an intelligent ther-mostat. In particular, the present disclosure is directed to an intelligent thermostat that can function as a hub having multi-band/multi-radio communication capabilities, long range network backhaul capabilities, private and public short-range wireless network capabilities, and can be imple-mented in a system for controlling and securing smart door locks and other smart devices within a multi-family prop-erty.

BACKGROUND

Technology and the benefits it provides often plays an important role with respect to how many consumers make decisions. This has become increasingly so in the real-estate industry, and more specifically in the multi-family residen-tial property market. To illustrate, Class A multi-family residential properties (e.g., apartments, etc.) may have key-less entry systems installed that allow residents to gain entry into their respective apartments by placing a key fob (or "fob"), smartphone, or smartcard in proximity to a door lock. As another example, these Class A multi-family resi-dential properties may have been constructed with infra-structure, such as Wireless Fidelity (Wi-Fi) access points and/or wired networks (e.g., Ethernet), for providing Inter-net access to residents. Although smartphones or other devices may be used to gain access to a resident's apartment by using the smartphone to interact with a door lock via Wi-Fi or the Internet, and thus not require the smartphone to be placed in proximity to the door lock, this improved ease of access by the resident is associated with additional costs to the property manager in installing and maintaining the infrastructure. Additionally, such infrastructure may be prone to component failures, such as a router or access point going offline, which may require onsite technicians or spe-cialized knowledge by the property manager's staff to repair. Another potential issue with Wi-Fi systems includes secu-rity, particularly when the infrastructure is being set up, associated wireless communications may be unprotected and thus capable of being intercepted by nefarious parties that identify when installation is occurring by the presence of technicians or internet service provider employees. While the security of wireless door locks and convenience these technologies provide are attractive to residents, deploying such technologies in older multi-family residential proper-ties, such as Class B and C multi-family residential prop-erties, can be cost prohibitive and/or present challenges with respect to the security of residents of the multi-family residential property, in addition to providing technological complexity and potential security issues, similar to the Class A multi-family residential properties.

For example, keyless entry systems may utilize various types of smart door locks. Such a smart door lock may be controlled (e.g., locked and unlocked) remotely through an Internet-accessible network connection and/or locally by a device (e.g., a fob, smartphone, smartcard, etc.) that is placed in proximity to a sensor of the door lock. The cost to deploy a smart door lock-based keyless entry system in a multi-family residential property can be significant due to the requirement that a local area network (LAN) communi-cation infrastructure (e.g., a property-wide mesh network, a Wi-Fi network, etc.) be provided to facilitate network-based control of the door lock. Such costs and challenges can also apply to installing other types of smart devices at a multi-family residential property.

Convenience and theft prevention are also issues that have slowed the deployment and integration of smart devices in multi-family residential properties. To illustrate, a property manager or owner may decide to install a set of smart devices in each unit of a multi-family residential property, such as a smart thermostat, a smart door lock, and one or more smart lights. Although these smart devices may be intended to remain a part of the unit after a resident moves out, if the resident is able to access and control the smart devices, they may steal the smart devices or tamper with or damage the smart devices prior to moving out. One way to prevent this outcome, or to reduce the likelihood, or for the property manager to have complete control of the smart devices. However, this may be inconvenient for the resident who may wish to control the lights or unlock the door without having to call the property manager each time. Although the property manager may provide an application to enable the resident to control certain aspects of the smart devices, this may not be convenient if the resident brings their own smart devices that they wish to use in the unit. In this situation, the resident may have to manage multiple different applications and potentially their own network infrastructure, such as a wireless router, in order to control both the installed smart devices and their own smart devices. Additionally, the property manager may have to send an employee to physically access the smart devices in order to provide a more convenient solution for the resident, or to reconfigure the installed smart devices after the resident moves out.

SUMMARY

Embodiments described herein provide a system that comprises smart thermostat hubs and a management plat-form for controlling and securing smart devices in a multi-family residential property. In some embodiments, a smart thermostat hub located within a unit of the multi-family residential property may comprise various communication interfaces to facilitate bi-directional communications between the smart thermostat hub and other devices in the system over different types of communication networks, including multiple types of wireless networks within the unit. For example, the smart thermostat hub may include a first communication interface that facilitates bi-directional communication between the smart thermostat hub and the management platform via a low power wide area network (LPWAN). The smart thermostat hub may also include a second communication interface that facilitates bi-direc-tional communication between the smart thermostat hub and various smart devices, e.g., smart door locks, smart lights, wireless cameras, security devices, smart TVs, smart speakers, entertainment devices, etc., present within a unit of the multi-family residential property via a short-range wireless network, e.g., a Bluetooth network, a Z-Wave network, a Zigbee network, a Thread-compliant network, a Matter-compliant network, or a Wi-Fi network associated with the unit. This short-range wireless network may be a private wireless network that is configured as a private network to maintain control and ownership of certain smart devices installed in the unit by a property manager. The smart thermostat hub may provide a network bridge between the private wireless network and a public wireless network associated with the unit. The public wireless network may be a short-range wireless network, such as a Bluetooth or Z-Wave network, or the public wireless network may be a Wi-Fi network. The public wireless network may be deployed and managed by the property manager or may be a network that is provided by a resident of the unit, such as by using their own network infrastructure (e.g., a Wi-Fi router or the like). The smart thermostat hub may provide limited access to devices of the private wireless network to devices of the public wireless network, such that requests that are not administrative level commands may be performed without changing access settings or ownership of the smart devices connected to the private wireless network. In some implementations, the private wireless network and the public wireless network may each be compliant with a Matter communication standard, and the smart thermostat hub may be configured to bridge the networks while preventing devices connected to the public wireless network from having co-administrator privileges with respect to devices of the private wireless network. The smart thermostat hub may also provide, for example, a gateway or bridge between the management platform and a smart door lock or other smart devices within the unit, thereby enabling access credentials for the smart door lock to be disabled from the management platform via the different bi-directional communication links provided by the first and second communication interfaces of smart thermostat hub.

The smart thermostat hub may improve a resident's experience and provide efficiencies to a property manager of the multi-family residential property, such as by providing enhanced security (e.g., by implementing smart door lock-based keyless entry systems) and by providing functionality for automating and improving various property management tasks. For example, the management platform may be configured to automatically detect (e.g., based on a database) when a unit of a multi-family residential property becomes vacant and may transmit control information to smart thermostat hub of the vacant unit. The control information may include information that identifies various smart devices within the unit, as well as parameters for configuring the identified smart devices. Upon receiving the control information via first communication interface, smart thermostat hub may transmit commands to each of the identified smart devices via second communication interface, where the commands configure the identified smart devices in accordance with parameters specified in the control information. Similar operations may be performed when the management platform detects that a resident is scheduled to move in to a vacant unit of the multi-family residential property. In some implementations, the management platform may communicate with the smart thermostat hub via the LPWAN as a default backhaul connection, and once another wireless network is deployed at the unit, the smart thermostat hub may be configured to initialize a connection with the management platform via the wireless network. In such examples, once this new connection is established, the LPWAN may be used only as a backup connection in the event that the wireless network goes down or experiences an error, or only for designated communications for which security or privacy is more important. Additionally, or alternatively, the smart thermostat hub may support a network environment where a resident may connect their own smart devices to a public wireless network and be provided with controlled (e.g., limited) access to smart devices that are already installed at the unit and connected to a private wireless network, thereby providing a more integrated and convenient experience for the resident. Such a configuration may also provide benefits to the property manager, as devices that are deployed to the unit may be protected from unauthorized overwriting or "wiping" by the resident, as well as enabling the property manager to reconfigure the devices via the LPWAN connection to the smart thermostat hub when the resident moves out.

In a particular aspect, a system for controlling smart devices within a unit of a multi-family residential property is disclosed. The system includes a smart thermostat hub that includes one or more processors and a memory coupled to the one or more processors. The smart thermostat hub also includes a first communication interface configured to communicatively couple the smart thermostat hub to a property management platform via a low-power, wide area network (LPWAN) communication link. The smart thermostat hub also includes a second communication interface configured to communicatively couple the smart thermostat hub to a first wireless network located at the unit via a first wireless communication link. The first wireless network is communicatively coupled to a first set of one or more smart devices. The one or more processors are configured to initialize a connection between the second communication interface and the property management platform via the first wireless network. The one or more processors are also configure to receive, from the property management platform via the first wireless communication link, control information associated with a smart device of the first set of one or more smart devices. The one or more processors are further configured to transmit, to the first smart device via the wireless communication link, a command that is based on the control information.

In another particular aspect, a method for controlling smart devices within a unit of a multi-family residential property is disclosed. The method includes receiving, by one or more processors of a smart thermostat hub, an initialization instruction from a property management platform via a low-power, wide area network (LPWAN) communication link. The method also includes initializing, by the one or more processors and based on the initialization instruction, a connection between the smart thermostat hub and the property management platform via a first wireless network communicatively coupled to the smart thermostat hub via a first wireless communication link. The first wireless network is located at the unit and communicatively coupled to a first set of one or more smart devices. The method includes receiving, by the one or more processors, control information from the property management platform via the first wireless network. The control information is associated with a smart device of the first set of one or more smart devices. The method further includes transmitting, by the one or more processors, a command that is based on the control information to the smart device via the first wireless network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 3 is a block diagram of another smart hub in accordance with embodiments of the present disclosure;

FIG. 8 is a flow diagram illustrating an exemplary method for securing smart devices within an apartment of a multi-family residential property in accordance with embodiments of the present disclosure;

FIG. 9 is a flow diagram of an exemplary method for retrieving access log data from a smart door lock in accordance with embodiments of the present disclosure;

FIG. 10 is a flow diagram illustrating an exemplary method for securing a smart door lock of an apartment of a multi-family residential property in accordance with embodiments of the present disclosure;

FIG. 11 is a flow diagram illustrating an exemplary method for securing a smart door lock of an apartment of a multi-family residential property in accordance with embodiments of the present disclosure;

FIG. 19 is a flowchart of an exemplary process for controlling or managing smart devices associated with a multi-family residential property in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
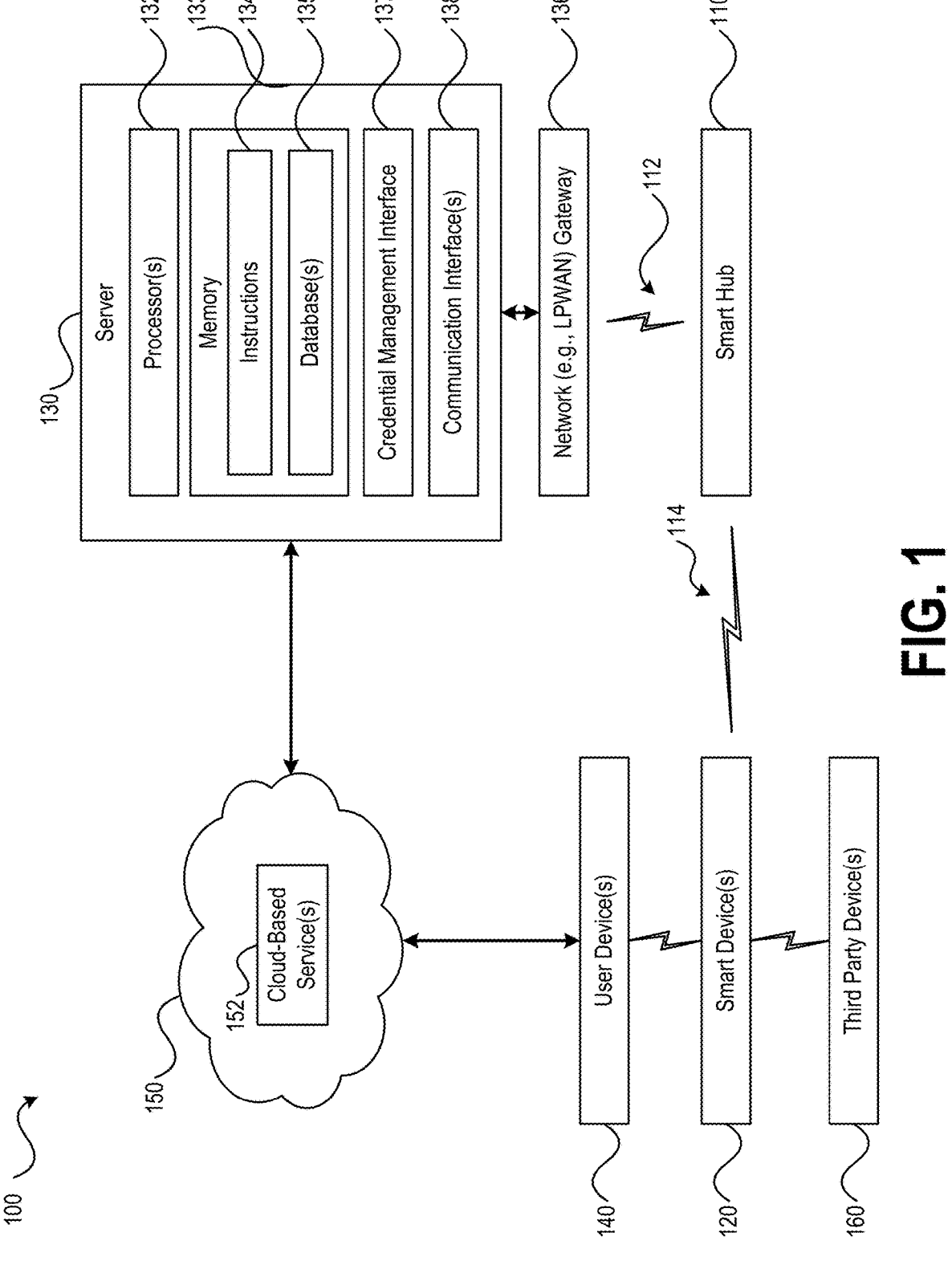
FIG. 1 is a block diagram of a system for managing and securing access credentials for smart devices within a multi-family residential property in accordance with embodiments of the present disclosure.

Referring to FIG. 1, a block diagram of an exemplary system for managing and securing access credentials for accessing a multi-family residential property using smart devices in accordance with aspects of the present disclosure is shown as a system 100. As described in more detail below, system 100 provides functionality that improves the manner in which access to multi-family residential properties is managed and secured. Such improvements are provided by leveraging low power, wide area network communications to initialize a backhaul connection from a smart thermostat hub to a property management platform by a higher bandwidth network once one becomes available. System 100 may also enable a property manager to maintain control and security of smart devices that are installed at various units and that are intended to remain after current residents move out, while providing the residents with the convenience of connecting to their own networks and devices through the use of private and public wireless networks. Additionally, system 100 may reduce the cost of deploying various technologies in a multi-family residential property, thereby enabling such technologies to be utilized in certain multi-family residential properties for which previous technologies were deemed cost prohibitive, such as Class B and Class C properties, or to be combined with existing technologies at Class A properties.

In FIG. 1, system 100 is illustrated as comprising smart hub 110, one or more smart devices 120, and server 130. As shown in FIG. 1, server 130 may include one or more processors 132, memory 133, credential management module 137, and one or more communication interfaces 138. Memory 133 may include random access memory (RAM), read only memory (ROM), hard disk drives(s) (HDDs), solid state drive(s) (SSDs), network attached storage (NAS) devices, or other types of memory devices for storing data in a persistent or non-persistent state. Memory 133 may store instructions 134 that, when executed by the one or more processors 132, cause the one or more processors 132 to perform the operations of server 130 described with reference to FIGS. 1-6. Additionally, one or more databases 135 may be stored at memory 133. Exemplary types of information that may be stored at the one or more databases 135 are described in more detail below. It is noted that although FIG. 1 illustrates server 130 as a standalone device, it is to be understood that server 130 and the functionality described herein with respect to the server 130, may be implemented using more than one server or via a collection of computing resources (e.g., processors, memory, communication interfaces, and the like) deployed in the cloud.

Credential management interface 137 may be configured to manage (e.g., create and disable) access credentials provided to residents of a multi-family residential property. For example, credential management interface 137 may be configured to generate access credentials that enable a resident to access one or more residential units of a multi-family residential property. Such a unit may correspond to, for example, the individual resident's apartment unit or a designated common area, such as a workout facility, a pool, a parking garage, a lounge, a conference room, a laundry room, a vending machine room, a lobby, an elevator, and the like, within the multi-family residential property. Access credentials may be stored on a device, such as a fob, a smartcard, or a resident's smartphone, which may be used to control (e.g., lock and unlock) a smart door lock installed on a door of the resident's apartment. In an embodiment, each of the smart door locks of the multi-family residential property may comprise logic configured to process access credentials presented for authentication. For example, when a resident places a device having the resident's access credential in proximity to a sensor (e.g., a near field communication (NFC) device, a Bluetooth device, etc.) of the smart door lock, access credential may be received by the logic for processing, which may include applying a hash function or other data processing technique. If the processing is successful (e.g., a result of the hash function or other processing technique satisfies a criterion), a lock control mechanism may be engaged, thereby enabling the resident to turn a knob that controls a deadbolt or other form of locking device (e.g., a mortise lock, a tubular lock, etc.) to either lock or unlock the smart door lock. If the processing is not successful (e.g., the result of the hash function or other processing technique does not satisfy the criterion), the lock control mechanism may not be engaged. When the lock control mechanism is not engaged, the knob that controls the deadbolt may spin freely (or not move at all), thereby preventing the deadbolt from being placed in a locked state or an unlocked state. Other types of locking devices may be similarly engaged or disengaged by a lock control mechanism based on the processing. Additional features provided by the smart door lock in accordance with embodiments are described in more detail below with respect to FIG. 12.

In an embodiment, rather than generating access credentials, the credential management interface 137 may interface (e.g., via a network 150) with a system of a third party service provider (not shown) that is configured to generate access credentials. In such an embodiment, the credential management interface 137 may enable property management personnel and/or a resident to request that an additional access credential, which may be utilized to unlock the smart door lock, be generated by the system of the third party service provider. As a result of the request, the system of the third party service provider may generate the requested access credential (assuming appropriate authentication of the request and/or requestor has been performed). Where the access credential is to be utilized by a user device, such as a smart phone, the system of the third party may provide the newly generated access credential to the user device directly, such as by downloading the access credential to the user device via an access credential management application installed on the user device, or indirectly, such via a message (e.g., a text message, e-mail message, etc.) provided to the user device that includes information that enables the user device to retrieve or otherwise obtain or download the newly generated access credential, or via another technique. In an embodiment, if an access credential that is to be disabled corresponds to an access credential that was generated by the system of the third party and that is stored on the user device, such as a smart phone, the server 130 may be configured to interact with the system of the third party to disable such access credentials, such as by providing information to the user device to disable further use of the access credential. If, however, the access credential is stored on a third party device 160, such as a fob or smartcard, disabling of the access credential may be accomplished via communication of control information to smart hub 110, as will be described in more detail below.

In an embodiment, one or more databases 135 may include a credential database storing information associated with smart door locks installed at the multi-family residential property. When an access credential for a particular smart door lock is to be generated, credential management module 137 may access the credential database to obtain information associated with the particular smart door lock, and then use the obtained information to create access credential. For example, the information stored in access credential database 135 may comprise information that may be used to generate access credentials that, when processed by the logic of the designated smart door lock, produce a successful result. Additionally, when new access credentials are generated, access credential management module 137 may update one or more records stored at the credential database (or another database), such as to record information that identifies the resident or individual access credential was provided to.

The one or more communication interfaces 138 may communicatively couple server 130 to smart hubs deployed within the multi-family residential property, such as smart hub 110, via one or more communication networks. For example, a first communication interface of server 130 may be configured to communicate with smart hub 110 via a communication link 112 over a low-power, wide area network (LPWAN), such as a Long Range (LoRa) wide area network (LoRaWAN), and a second communication interface of server 130 may be configured to communicate with the one or more communication networks via a short-range or non-LPWAN communication link, such as an Institute of Electrical and Electronics Engineers (IEEE) 802.11 communication link, an Ethernet communication link, and the like. In some embodiments, the first communication interface of server 130 may be configured to communicate with smart hub 110 via a LPWAN, as will be described in further detail below. Accordingly, communication link 112 may be an LPWAN connection between remote server 130 and smart hub 110, such as a LPWAN communication link or another type of network topology utilizing low-power or LoRa-based wide area network (LoRaWAN) communication links. For example, in an embodiment, communication link 112 may utilize narrowband-Internet of Things (NB-IoT) communication links, Sigfox-based communication links, Weightless communication links, DASH7 communication links, Wize communication links, chirp spread spectrum (CSS)-based communication links, MIoTy communication links, IEEE 802.11ah communication links, or the like. As another example, in an embodiment, communication link 112 may utilize a low-power cellular communications protocol, such as Long-Term Evolution for Machines (LTE-M) or Long-Term Evolution Type Communication (LTE-MTC) communication links.

Alternatively, the communication link 112 may be a communication link within a cellular network. Examples of such a LPWAN include, but are not limited to, a Global System for Mobile Communications (GSM) network, a General Packet Radio Service (GPRS) network, a Code-Division Multiple Access (CDMA) network, a Frequency-Division Multiple Access (FDMA) network, an Orthogonal Frequency-Division Multiple Access (OFDMA) network, and a Space-Division Multiple Access (SDMA) network. Such a cellular network may support any of various cellular communication standards and technologies including, but are not limited to, 3G, 4G, Long Term Evolution (LTE), 5G, and new technologies being developed, such as 6G.

In an embodiment, the first communication interface may communicatively couple the server 130 to an appropriate network gateway 136, as shown in FIG. 1. The network gateway 136 may be configured to relay information received from the server 130 to one or more smart hubs using the communication link 112 and to relay information received from one or more smart hubs via the communication link 112 to the server 130. As described above, the communication link 112 in some implementations may be a communication link within a LPWAN. In some such implementations, the network gateway 136 may include or be integrated in, or replaced by, one or more other components of a LPWAN.

Smart hub 110 may include a first communication interface and one or more additional communication interfaces. First communication interface may communicatively couple smart hub 110 to server 130 via a communication link 112, e.g., one or more connections over a LPWAN or other long-range communication network, and one or more additional communication interfaces may communicatively couple smart hub 110 to one or more smart devices 120 via one or more communication links 114, e.g., one or more connections over a wireless personal area network (WPAN) or other short-range communication network, such as a Wi-Fi communication link, a Zigbee communication link, a Bluetooth communication link (e.g., a standard Bluetooth communication link or a Bluetooth low energy (BLE) communication link), a Z-Wave communication link, a Matter-compliant communication link, a Thread-compliant communication link, and the like, associated with a unit of the multi-family residential property. As referred to herein, Matter includes a set of wireless communication standard(s), protocol(s), or platform that focus on supporting a unified IoT ecosystem using internet protocol (IP)-based communications. As referred to herein, Thread is an IP-based wireless communication protocol for mesh networking. As will be described in more detail below, smart hub 110 may be deployed within any designated area or unit of a multi-family residential property, such as an individual apartment or residential unit, or a designated common area, such as a gym, a game room, etc., and may be utilized to facilitate remote access to, and control of, smart devices in proximity to smart hub 110.

Figure 2:
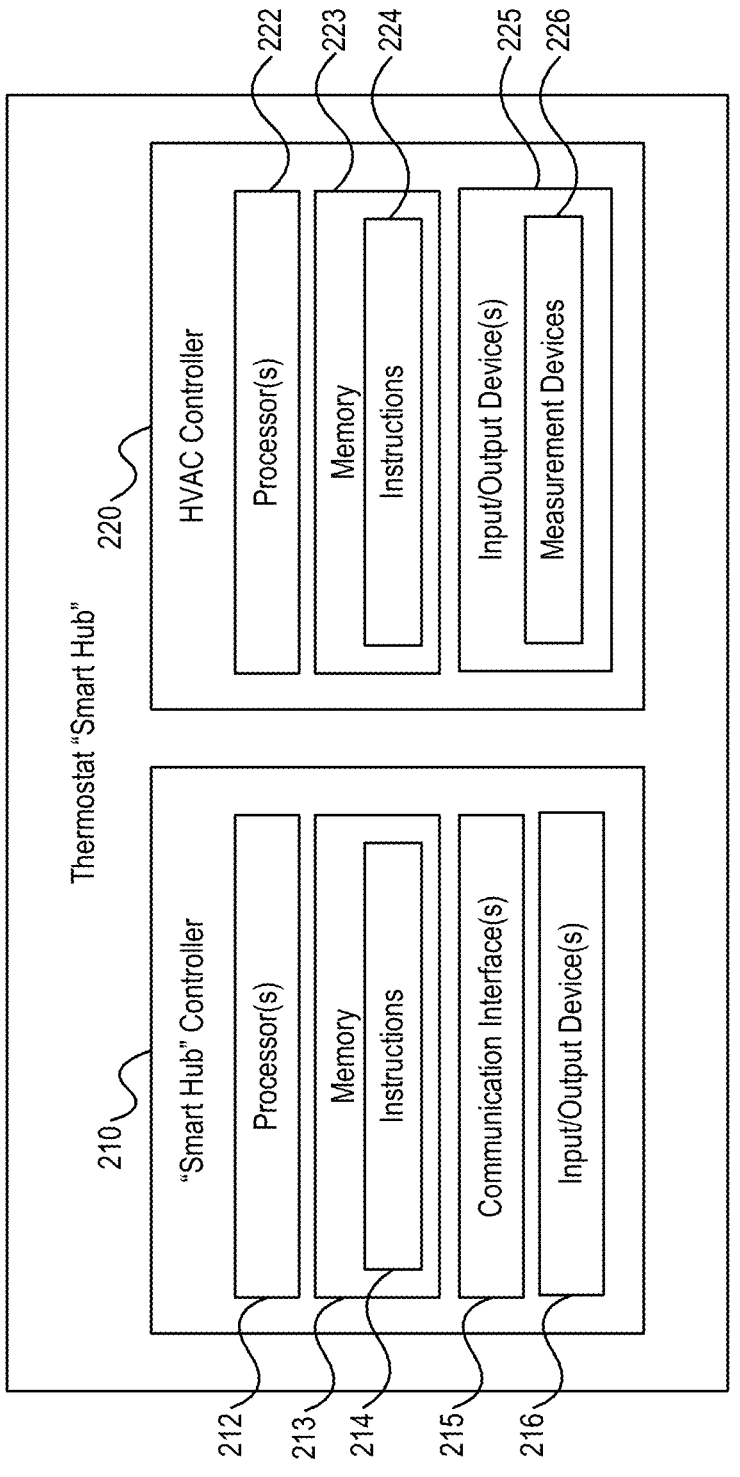
FIG. 2 is a block diagram of a smart thermostat hub in accordance with embodiments of the present disclosure.

In an embodiment, smart hub 110 may be a smart thermostat hub. For example, in FIG. 2, a block diagram of a smart thermostat hub 200 in accordance with embodiments of the present disclosure is shown. As shown in FIG. 2, smart thermostat hub 200 includes a smart hub controller 210 and a heating, ventilation, and air conditioning (HVAC) controller 220. Smart hub controller 210 may include one or more processors 212, a memory 213, communication interfaces 215, and one or more input/output (I/O) devices 216. Memory 213 may include RAM, ROM, one or more HDDs, one or more SSDs, or other types of memory devices for storing data in a persistent or non-persistent state. Memory 213 may store instructions 214 that, when executed by the one or more processors 212, cause the one or more processors 212 to perform operations of smart hub devices described with reference to FIGS. 1-6. As explained with reference to smart hub 110 of FIG. 1, communication interfaces 215 may include a first communication interface configured to communicatively couple smart hub controller 210 to a remote server (e.g., server 130 of FIG. 1) via a LPWAN or other long-range communication link (e.g., communication link 112 of FIG. 1) and one or more additional communication interfaces configured to communicatively couple smart hub controller 210 to one or more smart devices (e.g., the one or more smart devices 120 of FIG. 1) via a WPAN or one or more short-range communication links (e.g., communication links 114 of FIG. 1), such as Wi-Fi communication links, Zigbee communication links, Z-Wave communication links, Bluetooth communication links, and the like.

The one or more I/O devices 216 may be configured to facilitate user interaction with smart hub controller 210. For example, a user (e.g., employee, contractor, or agent of the multi-family residential property) may periodically couple an external device (e.g., third party devices 160 of FIG. 1) to smart hub controller 210 to perform software upgrades, diagnostics, etc. It is noted, however, that the communication link between smart hub controller and server may be utilized for these purposes in some embodiments. The one or more I/O devices 216 may include a USB interface, a serial port interface, or other type of wired or wireless interface suitable for exchanging information with, obtaining information from, or providing information to smart hub control 210. Additionally, I/O devices 216 may include a display device, which may provide information regarding an operational status of smart hub controller 210. For example, the display device may present information associated with a status of various communication links between smart hub controller 210 and smart devices and/or the remote server. It is noted that the specific I/O devices described above have been provided for purposes of illustration, rather than by way of limitation and that I/O devices 216 may include other types of I/O devices that facilitate interaction with smart hub controller 210.

As shown in FIG. 2, HVAC controller 220 may include one or more processors 222, a memory 223, and one or more I/O devices 225. Memory 223 may include RAM, ROM, one or more HDDs, one or more SSDs, or other types of memory devices for storing data in a persistent or non-persistent state. Memory 223 may store instructions 224 that, when executed by the one or more processors 222, cause the one or more processors 222 to perform operations for modifying an ambient setting of an environment, such as heating or cooling an apartment of a multi-family residential property to a desired temperature. One or more I/O devices 225 may include buttons, display devices, a touch screen, speakers, microphones, and/or other devices that facilitate interaction with HVAC controller 220. For example, a user may interact with the one or more I/O devices 225 to adjust a temperature of the thermostat. In response to such interaction, HVAC controller 220 may initiate operations to heat or cool an ambient environment specified by the user interaction. As shown in FIG. 2, one or more I/O devices 225 may also include measurement devices 226, such as a temperature sensor, which may be used to determine whether the temperature of the ambient environment is within a threshold tolerance (e.g., 0.5 degree, 1 degree, 2 degrees, etc.) of the target temperature specified by the user interaction. It should be appreciated that measurement devices 226 may include any number of sensors or devices for measuring and recording any of various types of measurements, as desired for a particular implementation.

Referring to FIG. 3, a block diagram of another smart hub in accordance with embodiments of the present disclosure is shown as a smart hub 300. As shown in FIG. 3, smart hub 300 includes smart hub controller 210, one or more processors 212, memory 213, instructions 214, communication interfaces 215, and I/O devices 216 described above with reference to FIG. 2. However, smart hub 300 of FIG. 3 also includes power interface 302. Power interface 302 may comprise one or more components (e.g., a plug configured to interface with a power outlet, a power coupling configured to couple smart hub 300 to a power source via electrical wiring of a structure, a battery interface, and the like) configured to provide operational power to smart hub 300. Therefore, as compared to smart thermostat hub 200 of FIG. 2, smart hub 300 of FIG. 3 illustrates an embodiment of smart hub as standalone device.

It is noted that, as compared to smart hub 300 of FIG. 3, smart thermostat hub 200 of FIG. 2 may provide several advantages for multi-family residential properties, such as Class B and C properties in particular. For example, a common problem when deploying new technologies in Class B and C properties is the lack of necessary infrastructure needed to support the new technology. To install the standalone smart hub illustrated in FIG. 3, an electrician would need to find or create a suitable source for tapping into existing electrical wiring of an apartment in order to hard wire smart hub 300 into the apartment's electrical power infrastructure. This may include hardwiring smart hub 300 to electrical wiring of a power outlet, which would result in loss of an existing power outlet of the apartment. Alternatively, an electrician may install smart hub 300 on a wall of the apartment by tapping into or splicing the existing electrical wiring of the apartment, but this option would create a significant cost if performed for many apartments of a multi-family residential property. An additional option would be to plug smart hub 300 into an electrical outlet of the apartment. This option may be problematic as the resident could easily unplug smart hub 300 from the electrical outlet, thereby preventing operation of smart hub 300 and the various features it provides with respect to certain smart devices of the apartment, such as managing and controlling a smart door lock and enhanced property management functionalities (e.g., controlling a thermostat, light fixtures, etc.).

In contrast, smart thermostat hub 200 of FIG. 2 is designed to be installed as a replacement to existing thermostats that may be present in a multi-family residential property. Even for Class B and Class C residential properties, the existing thermostats would be coupled to existing electrical wiring of the structure thereby enabling installation of smart thermostat hub 200 by simply removing the existing thermostat and coupling smart thermostat hub 200 to the existing electrical wiring. For example, smart thermostat hub 200 of FIG. 2 may include a power interface that is configured to be coupled to electrical wiring of a unit using a same configuration as conventional thermostats. Such an installation can be performed with minimal effort and cost (e.g., by decoupling the existing thermostat from the electrical wiring and coupling smart thermostat hub 200 in place of the existing thermostat), thereby significantly reducing the cost to deploy smart thermostat hubs in a multi-family residential property. For example, maintenance personnel may install smart thermostat hub 200 without additional splicing or tapping into the electrical wiring of the unit, and smart thermostat hub 200 may be installed without having to plug smart thermostat hub 200 into a power outlet, thereby reducing a likelihood that a resident would remove smart thermostat hub 200, and without hardwiring smart thermostat hub 200 to the power outlet, thereby preserving the power outlet for use by the resident. Additionally, because smart thermostat hub 200 may be enclosed within a single housing, the likelihood that a resident would tamper with or remove smart thermostat hub 200, and thereby inhibit the benefits that smart thermostat hub 200 provides with respect to security and property management functionality would be minimized. A further advantage of smart thermostat hub 200 is that thermostats may be centrally located within a structure for which they provide control of an HVAC system, such as a central location within an apartment of a multi-family residential property. This may be advantageous as it enables smart hub functionality to be centralized with respect to the apartment, thereby increasing the likelihood that the smart hub's one or more second communication interfaces (e.g., communication interfaces for interacting with smart devices), which may utilize communication links having short range communication capabilities, are within communication range of smart devices present in the apartment, such as a smart door lock.

Figure 4:
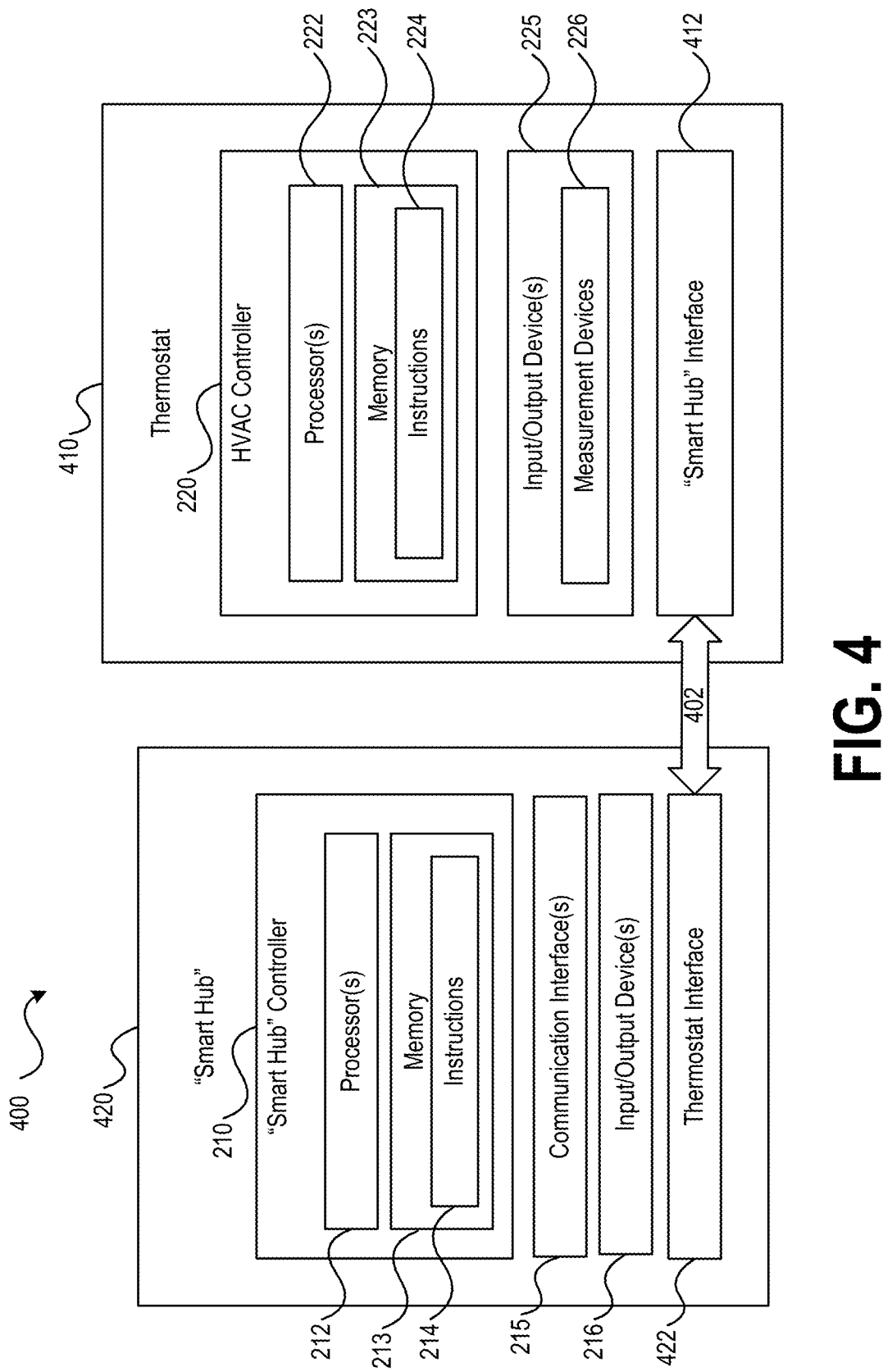
FIG. 4 is a block diagram of a modular smart thermostat hub in accordance with embodiments of the present disclosure.

Referring to FIG. 4, a block diagram of a modular smart thermostat hub in accordance with embodiments of the present disclosure is shown as modular smart thermostat hub 400. As shown in FIG. 4, the modular smart thermostat hub may comprise a thermostat component 410 and a smart hub component 420. Thermostat component 410 may comprise the components of smart thermostat hub 200 that provide control over an HVAC system of a structure, such as HVAC controller 220 (including the one or more processors 222 and memory 223 storing instructions 224) and I/O devices 225 (including the measurement devices 226). Smart hub component 420 may include components of smart thermostat hub 200 of FIG. 2 and/or smart hub 300 of FIG. 3 that provide the above-described improvements with respect to security and property management through utilization of smart devices, such as a smart door lock, a thermostat, lights fixtures, and the like. For example, as illustrated in FIG. 4, smart hub component 420 may comprise smart hub controller 210 (including the one or more processors 212 and memory 213 storing instructions 214), communication interfaces 215, and I/O devices 216.

Additionally, thermostat component 410 may comprise a smart hub interface 412 and smart hub component 420 may comprise a thermostat interface 422. The modular smart thermostat hub 400 may be formed by coupling smart hub interface 412 and the thermostat interface 422, as shown at arrow 402. For example, smart hub interface 412 may comprise one or more pins and the thermostat interface 422 may comprise a connector configured to couple the one or more pins of smart hub interface 412. Alternatively, the thermostat interface 422 may comprise one or more pins and smart hub interface 412 may comprise a connector configured to couple the one or more pins of the thermostat interface 422. It is noted that although smart hub interface 412 and the thermostat interface 422 have been described as being coupled via one or more pins and a connector, this exemplary technique for interfacing smart hub component 420 and thermostat component 410 has been provided for purposes of illustration, rather than by way of limitation and that other techniques and components may be used to couple smart hub component 420 and thermostat component 410.

As shown above, the modular smart thermostat hub 400 may comprise separate components (e.g., thermostat component 410 and smart hub component 420) that, when coupled, facilitate the operations for providing the enhanced security features for managing and securing smart door locks and the improved property management functionality, as described herein. The modular design of the modular smart thermostat hub 400 may provide various advantages over smart thermostat hub 200 and smart hub 300 described above. For example, due to the modular design, a multi-family residential property may be incrementally upgraded to provide the various features described herein, such as installing thermostat component 410 at a first point in time and then installing smart hub component 420 at a second point in time that is later than the first point in time. This may allow a multi-family residential property to be upgraded over time using components (e.g., thermostat component 410 and smart hub component 420) that may be cheaper (individually) than smart thermostat hub 200, enabling the upgrades to be performed as a budget of the multi-family residential facility allows. The modular smart thermostat hub may also provide additional advantages regardless of whether the components (e.g., thermostat component 410 and smart hub component 420) of the modular smart thermostat hub are installed at the same point in time or at different points in time. For example, if thermostat component 410 of the modular smart thermostat hub 400 fails, thermostat component 410 may be replaced without replacing smart hub component 420 and if smart hub component 420 of the modular smart thermostat hub 400 fails, smart hub component 420 may be replaced without replacing thermostat component 410. Therefore, the cost of maintaining the modular smart thermostat hub 400 in an operational state over time may be less than smart thermostat hub 200 of FIG. 2. It is noted that the components of the modular smart thermostat hub 400 may be provided within a single housing. For example, thermostat component 410 may comprise a housing that includes a cavity or space within which smart hub component 420 may be provided. The cavity or space within the housing may be accessible through an access panel of the housing.

It is noted that each of the different smart hub configurations illustrated in FIGS. 2-4, which are configured to utilize LPWAN or other long-range communication links (e.g., communication link 112 of FIG. 1), provide the additional advantage of not requiring network infrastructure, such as a Wi-Fi network, to be deployed in concert with the deployment of the smart hub devices in order to facilitate operations in accordance with embodiments of the present disclosure. This significantly reduces the costs to deploy the smart hubs in a multi-family residential property. However, it is noted that even in situations where such network infrastructure is present, the smart hubs illustrated in FIGS. 2-4 still provide certain advantages, as will be described in more detail below with reference to FIG. 7.

Referring back to FIG. 1, during operation of system 100, residents of a multi-family residential property may be provided with access credentials, as described with reference to credential management module 137. Access credentials may be provided to the residents via user devices 140 or third party devices 160. Exemplary user devices 140 may include a resident's smartphone, tablet computing device, smartwatch, or other electronic devices having appropriate functionality for interacting with a smart door lock and other smart devices, such as functionality enabling communication via NFC, Bluetooth, Zigbee, Z-wave, and the like. Exemplary third party devices 160 may include fobs or smartcards provided by the multi-family residential property, such as by an employee or property manager associated with the multi-family residential facility.

In an embodiment, access credentials may also be provided to the user devices 140 via a cloud-based service 152 accessible via network 150, such as the Internet. For example, a property management entity associated with a multi-family residential facility may provide a website and/or mobile application that residents may utilize to obtain access credentials. The website and/or the mobile application may enable residents to interact with the cloud-based service 152 to request access credentials and perform various tasks relating to the current operating status or settings of each smart device, as will be described in further detail below. In some embodiments, a resident may interact with the website and/or mobile application via a graphical user interface (GUI) provided at the resident's mobile device (e.g., user device 140) to access and control various features of the various smart devices installed at the resident's apartment unit or at a designated common area within the multi-family residential property. An example of such a GUI will be described in further detail below with respect to FIG. 17. The cloud-based service 152 may be configured to generate access credentials in a manner similar to the techniques described above with respect to credential management module 137 of server 130. For example, after authenticating a resident, the cloud-based service 152 may generate an access credential based on information stored in a database, such as the credential database described above. Once generated, the cloud-based service 152 may provide access credential to the resident's user device.

As described above, generation of credentials may not require interaction with a smart door lock. Instead, access credential may be generated such that when access credential is presented to the smart door lock (e.g., via placing a device loaded with access credential in proximity to the smart door lock), a result (e.g., a hash value or other information) generated by the credential processing logic of the smart door satisfies an access authorization criterion. The access authorization criterion may comprise a pre-determined value (e.g., a pre-determined hash value or other information) or may comprise a range of pre-determined values. Utilizing access authorization criteria comprised of a range of pre-determined values may facilitate various advantageous features of system 100.

For example, as access credentials are generated, by either the cloud-based service 152 or credential management module 137, each access credential may be configured to result in a different value within the pre-determined range of values of the corresponding smart door lock, and information that identifies each individual to which an access credential is provided may be recorded (e.g., at the credentials database or another database). The smart door lock may comprise a memory configured to log information associated with each access credential presented to the smart door lock, such as the result generated by the processing logic of the smart door lock in response to presentation of an access credential and timestamp information associated with a time when access credential was presented. The logged information may also include information associated with a state of the smart door lock at the time access credential is present. For example, the state of the smart door lock may be configurable to change between a locked state and an unlocked state, as described above. Each time the state of the smart door lock changes, information indicating the current state of the smart door lock and the time of the state change may be recorded in memory of the smart door lock.

The log of information recorded by the smart door lock may be subsequently retrieved to audit access of the smart door lock. To illustrate, smart hub 110 may be configured to periodically generate and transmit an audit log request that may be transmitted to the smart door lock via a communication link provided by the one or more second communication interfaces of smart hub 110. In response to the request, the smart door lock may transmit the log of information to smart hub 110 via the communication link. Upon receiving the log of information, smart hub 110 may transmit the log of information to server 130 via a first communication link provided by the first communication interface (e.g., a LPWAN communication interface), and server 130 may store the log of information in the one or more database 135, such as at an access audit log database. In some embodiments, smart hub 110 may be configured to transmit the log of information to server 130 according to scheduling information provided by server 130 via a LPWAN. For example, the data transmission bandwidth provided by LPWAN communication links in some cases may be lower than other types of wireless communication links, such as Wi-Fi, and therefore, transmission of the log of information may take appreciable time. By scheduling transmission of the log of information to server 130 at specific times, which may correspond to off-peak hours (e.g., overnight), interference with other smart hubs of a multi-family residential property may be minimized, which may ensure more reliable communication with smart hubs of the multi-family residential property in an emergency or priority situation, such as if a credential for a smart door lock needs to be disabled.

Additionally or alternatively, server 130 may transmit control information to smart hub 110, where the control information comprises information that identifies the smart door lock and instructs smart hub 110 to obtain at least a portion of the log of information (e.g., information associated with all access credentials presented to the smart door lock, invalid (denied) access credentials presented to the smart door lock, valid access credentials presented to the smart door lock; information associated with changes in the state (actuation events) of the smart door lock; a current state of the smart door lock; and the like), where the portion of the log of information may be specified temporally (e.g., a portion of the log information corresponding to a particular period of time, such as a specified hour, range of hours, day, number of days, a week, and the like), by event type (e.g., state changes, received valid and/or invalid access credentials, disablement of access credentials, authorization of new access credentials, and the like), or both temporally and by event type (e.g., occurrences of one or more particular event types during one or more defined periods of time). It is noted that temporal portions of the retrieved log information may include consecutive time units, such as portions of the log information captured during a consecutive number of hours, days, weeks, and the like. Additionally, the temporal portions of the retrieved log information may include disjoint time units, such as portions of the log information captured on a first day in a week and a third day of the week, a first number of hours in the morning of a particular day and a second number of hours during the evening of the particular day or another day, and the like. The retrieved access log information may include information that identifies particular access credentials associated with the retrieved portion(s) of the information logged by the smart door lock. The ability to probe the smart door lock via control information transmitted by server 130 may improve the security of a multi-family residential property. For example, if a resident is unsure of whether his/her apartment was locked when they left, the resident may contact property management personnel to inquire about the status of the smart door lock, and the property management personnel may utilize a property management platform provided by server 130 to transmit control information to smart hub 110 associated with the resident's apartment. In this example, the control information may identify the smart door lock associated with the resident's apartment and may specify that smart hub 110 is to retrieve only the current status of the smart door lock (e.g., whether the smart door lock is in the locked state or the unlocked state), rather than the entire log of information stored at memory of the smart door lock. By only retrieving the current state of the smart door lock, the requested information may be returned to server 130 more quickly. If the status of the smart door lock is determined to be unlocked, the property management personnel may visit the resident's apartment and secure the smart door lock (e.g., place the smart door lock in the locked state).

In an embodiment, a resident may initiate a status check of the smart door lock via cloud-based service 152. For example, as described above, the resident may access a website or a mobile application via a graphical user interface at the resident's mobile device (e.g., user device 140) that facilitates interaction with the cloud-based service 152. The graphical user interface may provide functionality that enables the resident to view the log of information associated with the smart door lock of the resident's apartment, as well as initiate a status check request to determine a current state of the smart door lock. When a status check request is initiated via the graphical user interface provided by the website or mobile application, the cloud-based service 152 may initiate transmission of a status check request message to server 130 via the network 150. The status check request message may include information identifying the smart door lock for which the status check has been request, such as information that identifies the resident, the resident's apartment number, a smart door lock identifier corresponding to the smart door lock of the resident's apartment, or other information that may be used to identify smart hub located at the resident's apartment. Upon receiving the status check request message, server 130 may obtain information indicating the current status of the smart door lock of the resident's apartment by transmitting control information to smart hub located at the resident's apartment via a LPWAN communication link, as described above.

Upon receiving the status information from smart hub, server 130 may provide the status information to the cloud-based service 152, which may present information associated with the current status of the smart door lock to the resident via the graphical user interface. The status information may be provided from server 130 to the cloud-based service 152 in a variety of ways. For example, server 130 may store the status information at the access audit log database and then transmit a message to the cloud-based service 152 that indicates the status check request is complete. The cloud-based service 152 may then retrieve the status information from the access audit log database for presentation to the resident via the graphical user interface. Additionally or alternatively, server 130 may include information that indicates the current status of the smart door lock in the response message, which eliminates the need for the cloud-based service 152 to access the access audit log database.

If the status of the smart door lock is determined to be unlocked, the resident may contact property management personnel to request that they visit the resident's apartment and secure the smart door lock (e.g., place the smart door lock in the locked state). The resident may contact the property management personnel to request that the resident's smart door lock be secured via a phone call, a text message (e.g., a text message sent to a number associated with the multi-family residential property for reporting maintenance requests, door security verification requests, and the like), an e-mail message, an instant message (e.g., an instant message created using functionality of the graphical user interface) provided to a device associated with property management personnel, or another method. In an embodiment, a confirmation notification may be provided to the resident once the smart door lock has been secured by the property management personnel.

It is noted that smart hub 110 may also be configured to maintain one or more activity logs, which may be periodically retrieved, in whole or in part, via communication link 112 and network gateway 136 by server 130 or the property management platform provided thereby. Such activity logs may include information associated with various smart devices, such as information that provides historical information associated with how a resident's thermostat is configured (e.g., preferred temperatures, etc.), whether various smart devices, such as lights, were left on for prolonged periods of time, etc. Such information may provide insights into the preferences of the residents of a multi-family residential property, which may be used to automatically customize other experiences of the resident. For example, a resident may gain access to a common area of the multi-family residential property, such as a gym, game room, a media room, and the like, by presenting the resident's access credential. Such access may be detected (e.g., via periodic probing of smart door locks associated with common areas of the multi-family residential property by one or more smart hubs associated with the common areas or via automatic transmission of access information to the one or more smart hubs by the smart door lock via a short-range or WPAN communication link) and utilized to configure the particular area to perceived preferences of the resident (e.g., a preferred temperature, etc.), where the perceived preferences are derived from the activity log maintained by the smart hub associated with the resident's apartment.

Additionally or alternatively, the resident (e.g., via user device 140) or a property manager (e.g., via server 130) may control one or more settings of the smart devices installed in a common area due at least in part to LPWAN connections between user device 140/server 130 and smart hub 110. As described above, smart hub 110 may be deployed within the common area to facilitate remote access to, and control of, the smart devices in proximity to smart hub 110 via a WPAN or other short-range communication network (e.g., a Wi-Fi, Zigbee, or Bluetooth network) associated with the common area. For example, a resident wishing to gain entry to the common area may interact with a graphical user interface of a mobile application executing at user device 140 to send an unlock command or instruction to the property management platform, which may forward the unlock command or instruction via a LPWAN connection to smart hub 110 for unlocking a smart door lock installed at the common area. The resident may also use the mobile application to send additional commands to smart hub 110 for other smart devices within the common area, e.g., commands for turning on smart lights or operating a smart television within the common area. Likewise, a property manager in this example may use a LPWAN connection between server 130 and smart hub 110 to monitor and control various aspects of the common area, such as locking smart door locks, dimming or turning off the smart lights, and controlling the temperature settings of a smart thermostat either after hours or at scheduled times throughout the day.

As briefly described above, server 130 may provide a property management platform that may be utilized to manage various aspects of a multi-family residential property. The property management platform may provide one or more graphical user interfaces that facilitate interaction with smart hubs installed at apartments of the multi-family residential property. To illustrate, the property management platform (e.g., server 130 or a cloud-based implementation of the functionality provided by server 130) may provide a graphical user interface that enables access credentials associated with a smart door lock to be disabled remotely. Via this graphical user interface, a property management user may view access credentials authorized for a particular smart door lock and select one or more access credentials that are to be disabled. Upon confirming which access credential(s) is to be disabled, server 130 may identify one or more smart hubs of the multi-family residential property associated with smart door locks for which the access credential(s) has been authorized (e.g., may be used to lock or unlock the smart door lock(s)), and may transmit control information to the identified smart hubs. For each of the identified smart hubs, the control information may identify the smart door lock and the access credential(s) that is to be disabled for the identified smart door lock.

As explained above, control information provided to a smart hub may include information that identifies one or more smart devices to which the control information pertains and information associated with one or more actions or parameters for modifying a configuration of the one or more smart devices. Continuing with this example, upon receiving the control information from server 130, smart hub(s) may identify one or more smart devices (e.g., one or more smart door locks) and may derive one or more commands for controlling the one or more identified smart devices in accordance with the control information, such as commands to disable access credentials specified in the control information at the identified smart door lock. Having determined the one or more smart devices to which the received control information pertains and deriving appropriate commands for controlling the one or more smart devices in accordance with the control information, smart hub(s) may initiate transmission of the derived commands to the smart devices via one or more second communication links provided by a second communication interface (e.g., a short-range or WPAN communication interface), and the smart devices may execute the commands. For example, upon receiving the commands, a smart door lock may disable the identified access credentials. In an embodiment, the smart door lock may disable an access credential by configuring a flag associated with the access authorization criteria used by the processing logic of the smart door lock to authenticate presented access credentials. A first value of the flag may indicate access credential is authorized to configure the smart door lock to the locked state and the unlocked state and a second flag value may indicate that access credential has been disabled. Once disabled, access credential may not be used to configure the smart door lock to the unlocked state or the locked state. In an embodiment, smart door locks may comprise an automatic locking mechanism that automatically configures the smart door lock to the locked state when a disable access credential is present. This may further enhance security since a smart lock that is in the unlocked state may be automatically transitioned to the locked state when a disable access credential is presented.

In addition to remotely disabling access credentials, property management personnel may manually disable access credentials associated with smart door locks of system 100, such as by coupling an external device (e.g., a laptop computing device, a tablet computing device, etc.) to the smart door lock and then using an application or utility provided by the external device to manage access credentials. In an embodiment, server 130 may be configured such that access credentials that have been disabled may not be re-enabled via smart hub 110. In this embodiment, a disable access credential may only be re-enabled by coupling the external device to the smart door lock, as described above. In an embodiment, disable access credentials may be re-enabled via control information provided to smart hub 110 by server 130. However, if such capability is provided, system 100 may be configured to require one or more users to authorize the re-enablement of access credential. For example, a manager, supervisor, or other member of property management personnel may need to provide a password in order to re-enable access credential via server 130 and smart hub 110. As another example, remotely re-enabling an access credential via server 130 and smart hub 110 may require authorization from a member of the property management personnel and the resident associated with the smart door lock where access credential is disabled. Requiring the resident to participate in the authorization to remotely enable an access credential may prevent a nefarious individual from gaining entry into the resident's apartment.

In an embodiment, access credentials may also be created (e.g., by either the credential management interface 137 or the system of the third party) that comprise information designed to disable another access credential when used. For example, suppose that a first access credential is to be disabled. A second access credential may be generated and configured to include information that is configured to disable the first access credential when the second access credential is presented to a particular smart door lock. The information for disabling the first access credential may include information that identifies the first access credential and other information that specifies an operation associated with the first access credential, such as to disable the first access credential. When the second access credential is presented to the smart door lock, the information for disabling the first access credential may be detected by the smart door lock in addition to detecting the second access credential, thereby enabling the second access credential to be used to change a stat of the smart door lock while also disabling the first access credential. It is noted that such techniques may be utilized to disable multiple access credentials, rather than a single access credential, and may also be utilized to disable one or more access credentials at multiple different smart door locks (e.g., by presenting the second access credential carrying the information for disabling the first access credential at multiple smart door locks where the first access credential has been previously authorized for use). Additionally, access credentials carrying information configured to disable one or more other access credentials may be presented to smart door locks via a user device (e.g., a smartphone, etc.) or via a third party device (e.g., a fob, a smartcard, etc.).

In addition to providing functionality for managing access credential, the property management platform provided by server 130 may also provide graphical user interfaces and features that facilitate intelligent management of a multi-family residential property. For example, the one or more database 135 may include a resident database that includes information associated with vacant apartments of the multi-family residential property, move-in dates associated with new residents, and move-out dates associated with departing residents. The property management platform may utilize this information to control and automate various property management tasks. For example, the property management platform may periodically (e.g., daily, weekly, monthly, etc.) analyze the resident databased to identify move out dates. When a move out date occurs, the property management platform may transmit control information to a smart hub 110 of the vacated apartment via the first communication link (e.g., a LPWAN communication link) to place various smart devices of the apartment into a vacant mode. To illustrate, the control information may identify the thermostat (e.g., the thermostat of smart thermostat hub 200 of FIG. 2 or thermostat component 410 of FIG. 4) of the vacated apartment and may include parameters specifying a temperature that the thermostat should be configured to while vacant. Smart hub 110 may receive the control information, detect that the control information is associated with the thermostat (e.g., based on device identification information included in the control information, and transmit one or more commands to the thermostat via the second communication link (e.g., a WPAN or other non-LPWAN communication link) to modify one or more operational settings of the thermostat in accordance with the control information. The one or more operational settings control at least one of a temperature setting of the thermostat and an operating mode of the thermostat, the operating mode configurable to change between a heating mode, a cooling mode, and an off mode (e.g., to turn the thermostat off).

In an embodiment, the control information may include scheduling information that specifies periods of time during which the thermostat is to be placed in a particular operating mode. For example, the thermostat scheduling information may specify first information that specifies the thermostat is to be configured to a first operating mode (e.g., the heating mode, the cooling mode, or the off mode) for a first period of time and second information that specifies the thermostat is to be configured to a second operating mode (e.g., the heating mode, the cooling mode, or the off mode) that is different from the first operating mode for a second period of time. The first information may be utilized to at least partially heat the vacant apartment during at least a portion of the night during winter months or cool the apartment during at least apportion of the day during summer months.

The particular temperatures associated with the first information and the second information may be determined to mitigate potential damage caused by seasonal temperatures, such as to prevent freezing of water pipes, etc. or prevent damage to paint or other potentially heat sensitive surfaces of the apartment. The second information may configure the thermostat to the off mode to minimize the operating costs associated with the vacant apartment. In an embodiment, the thermostat scheduling information may be dynamically generated. For example, the property management platform may be configured to receive weather data (e.g., via an RSS feed or from another third party source of weather information), and may generate commands to control the configuration of the thermostat based on the weather information, such as to place the thermostat in the heating mode if the weather data indicates severely cold temperatures are expected. As the weather data changes, updates thermostat configuration information may be generated and provided to the thermostat via the smart hub 110, as described herein.

As another example, the control information may identify one or more smart light fixtures of the vacated apartment and may include information that indicates the light fixtures are to be turned off. Smart hub 110 may receive the control information, detect that the control information is associated with the one or more smart light fixtures, and transmit one or more commands to the one or more smart light fixtures via the second communication link (e.g., the WPAN communication link) to turn the one or more smart light fixtures off. Alternatively, the control information may specify that one or more of the smart light fixtures of the vacant apartment are to be, at least periodically, turned on. In such instances, smart hub 110 may transmit additional commands to turn on any smart light fixtures based on the control information, which may include scheduling information that indicates times and dates for turning each applicable light fixture on and/or off.

By using server 130 and smart hub 110 to place vacated apartments into the vacant mode, operating costs associated with the multi-family residential property may be significantly reduced. For example, if a thermostat in a vacated apartment is configured to cool the vacated apartment to a low temperature, the thermostat may remain configured in that state until a new resident moves into the apartment. Operating an HVAC system to cool a vacant apartment for a potentially long period of time may result in significant costs, which are avoided using the above-described techniques.

To illustrate, suppose that a resident prefers a "cold" apartment and configures the thermostat to maintain the apartment at a particular temperature (e.g., <75° F.). If, during a walkthrough performed in connection with the resident vacating the apartment, the thermostat setting is not noticed, the apartment may continue to be cooled in accordance with the settings configured by the resident, thus maintaining the now vacated apartment at the temperature preferred by the former resident. This may cause the property owner (or property management company) to incur significant unnecessary costs associated with cooling a vacant apartment. However, as described herein, a property management platform in accordance with embodiments of the present disclosure may automatically detect (e.g., based on information stored in the one or more databases 135) the apartment has been vacated and via the smart hub 110, may configured the thermostat to the vacant mode, which configures the thermostat's temperature setting to maintain the vacant apartment at a temperature specified by the property management company. This temperature may be higher than temperatures typically configured by residents, such as 80° F. Thus, while the apartment is vacant, the thermostat may maintain the apartment at a higher temperature, resulting in reduced costs during the duration of the vacancy. In an embodiment, the vacant mode may further be configured to turn the thermostat off, at least periodically, such that the HVAC system is not operated at all, which may further reduce the costs associated with the vacant apartment.

Similarly, the above-described techniques for placing a vacant apartment into vacant mode may also eliminate costs associated with light fixtures being allowed to remain on in a vacant apartment. It is noted that in addition to facilitating control of smart devices within apartments of a multi-family residential property, the property management platform may also be utilized to control smart devices associated with public areas of a multi-family residential property, such as gyms, conference rooms, game rooms, parking lots/garages, walking paths, and other common spaces maintained by the property management personnel. For example, the above-described techniques may be utilized to transmit control information to smart hubs communicatively coupled to smart light fixtures and/or thermostats associated with such areas of the multi-family residential property to minimize power consumption and associated costs, such as turning the smart light fixtures off at a particular time (e.g., when a common space is deemed closed), turning the smart light fixtures on at a particular time, such as to light up pathways at night, or increasing the temperature of thermostats at a particular time (e.g., when the leasing office or other area is closed). Further, the property management platform may utilize the above-described techniques to verify whether any smart door locks associated with the areas of the multi-family residential property maintained by the property management personnel were left unlocked, and transmit a notification to a member of the property management if any smart door locks are detected to be in the unlocked state, such as a smart door lock associated with the leasing office.

From the foregoing, it is to be appreciated that the various devices illustrated in FIG. 1, as well as they features they provide, represent a significant improvement to technologies for managing aspects of a multi-family residential property through control of smart devices located within multiple areas of the property. For example, system 100 utilizes LPWAN communication links to provide backhaul communication between a central location, such as a leasing office or a remote property management platform at a server located away from the property, and smart hubs located at the various apartments (e.g., units) or common areas of the multi-family residential property. In contrast with conventional property management solutions, system 100 does not require a mesh network or Wi-Fi network infrastructure to be deployed throughout the property. This significantly reduces the costs associated with deploying an intelligent property management system, such as system 100 described above, and makes it feasible to deploy intelligent property management systems in certain types of multi-family residential properties, such as Class B and Class C properties, for which previous technologies requiring mesh or Wi-Fi networks were cost prohibitive. System 100 also provides features that improve the security of multi-family residential properties, such as by enabling credentials for smart door locks to be remotely disabled via smart hub 110 and allowing smart door locks to be probed for information associated with a state of the smart door lock or to obtain access log information. Additionally, system 100 provides features that improve property management capabilities, such as by automatically placing vacant apartments into a vacant mode designed to improve the energy efficiency and reduce the operating costs of the multi-family residential property.

Figure 5:
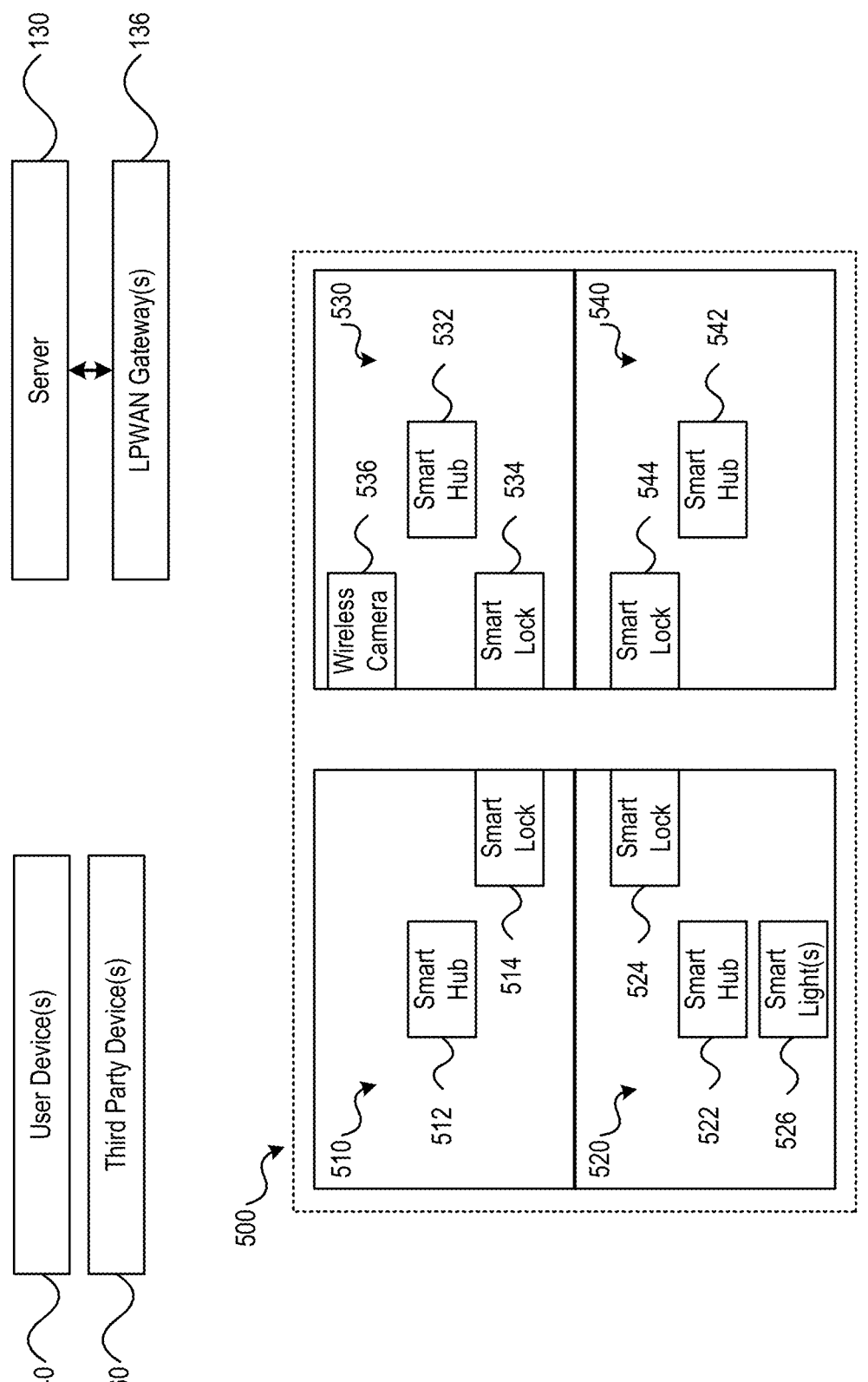
FIG. 5 is a block diagram illustrating aspects of an intelligent property management system configured in accordance with embodiments of the present disclosure.

Referring to FIG. 5, a block diagram illustrating aspects of an intelligent property management system configured in accordance with embodiments of the present disclosure is shown. As shown in FIG. 5, a building 500 of a multi-family residential property may include a plurality of apartments (or residential units) 510, 520, 530, 540. The apartments 510, 520, 530, 540 may include smart hubs 512, 522, 532, 542, respectively, which may comprise smart thermostat hub 200 of FIG. 2, smart hub 300 of FIG. 3, or the modular smart thermostat hub 400 of FIG. 4. Additionally, each of the apartments 510, 520, 530, 540 may include a smart door lock, illustrated in FIG. 5 as smart door locks 514, 524, 534, 544. Each of smart hubs 512, 522, 532, 542 may communicate with server 130 via a first communication link (e.g., a LPWAN communication link) and may communicate with one or more smart devices, such as thermostat or the smart door locks 514, 524, 534, 544, via a second communication link (e.g., a WPAN communication link or other type of non-LPWAN communication link).

As described above, smart hubs 512, 522, 532, 542 may be utilized to control various smart devices (e.g., smart door locks 514, 524, 534, 544) present within the respective apartments of the building 500. For example, suppose that a resident of the apartment 510 left for work and was not sure whether he locked the smart door lock 514 on his way out. As described above with reference to FIG. 1, the resident may utilize a user device 140, such as a smartphone, to access a cloud-based service (e.g., the cloud-based service 152 of FIG. 1) hosted by server 130 to obtain the current status of the smart door lock 514. If the resident discovers that he did forget to lock the smart door lock 514, the resident may request that property management personnel visit the apartment 510 and secure (e.g., lock) the smart door lock 514. Once secured, the resident may be notified. Alternatively, the resident may use an application executed by the user device 140 to obtain the current status of the smart door lock 514 and to send a command to smart hub 512 to cause smart hub 512 to issue a command to transition the smart door lock 514 into a locked state. An example of a GUI of such an application is described in further detail below with reference to FIG. 17.

As another example, suppose that two residents live in apartment 530 and each of the residents have an access credential loaded onto a third party device 160, such as a fob or smartcard. If one of the residents living in apartment 530 becomes violent toward the other resident, it may be necessary to prevent the aggressor resident from gaining access to apartment 530. As described above, previous systems that utilized smart door locks would require property management personnel to physically visit the apartment 530 and connect an external device to the smart door lock 534 in order to disable the aggressors access credential. As described above, to disable the aggressor's access credential, the property management personnel may present a credential that includes information designed to disable the aggressor's access credential in order to perform the modification. Depending on the urgency with which the credential needs to be disabled, the property management personnel may not arrive in time to prevent the aggressor resident from gaining entry to the apartment 530 and causing harm to the other resident. However, utilizing the property management platform provided by server 130, property management personnel may remotely disable the aggressor resident's access credential by transmitting control information to smart hub 532, where the control information causes smart hub 532 to communicate with the smart door lock 534 to disable access credential. As can be appreciated, this functionality enables access credentials to be disabled quickly, significantly enhancing the security services that may be provided to the residents of the multi-family residential property.

In yet another example, suppose that a resident of apartment 520 has moved out and apartment 520 is now vacant. As described above, the property management platform provided by server 130 may detect the status of the apartment 520 is now vacant and may automatically transmit control information to smart hub 522 to place various smart devices into vacant mode. For example, based on the control information, smart hub 522 may turn off one or more smart lights 526 within the apartment 520 and may configure a thermostat (not shown in FIG. 5) of the apartment 520 to a predetermined temperature. This capability may significantly reduce the power consumption of the multi-family residential facility, resulting in significant cost savings. Additionally, the control information provided to smart hub 522 may instruct smart hub 522 to communicate with the smart door lock 524 to disable the former resident's access credentials. This may prevent the former resident or someone possessing the former resident's access credentials from gaining unauthorized access to the apartment after resident has moved out.

Now suppose that apartment 540 is currently vacant, but a new resident is scheduled to move in soon. On the day the new resident is to move in, the property management platform provided by server 130 may transmit control information to smart hub 542 that instructs smart hub 452 to adjust a temperature setting of the thermostat for the apartment 540 in advance of the resident moving in. For example, the control information may be configured to cause the thermostat to start cooling the apartment an hour ahead of a scheduled move in time or at some pre-determined time of day so that the apartment is cooler (relative to the vacant mode) when the resident moves in.

Figure 6:
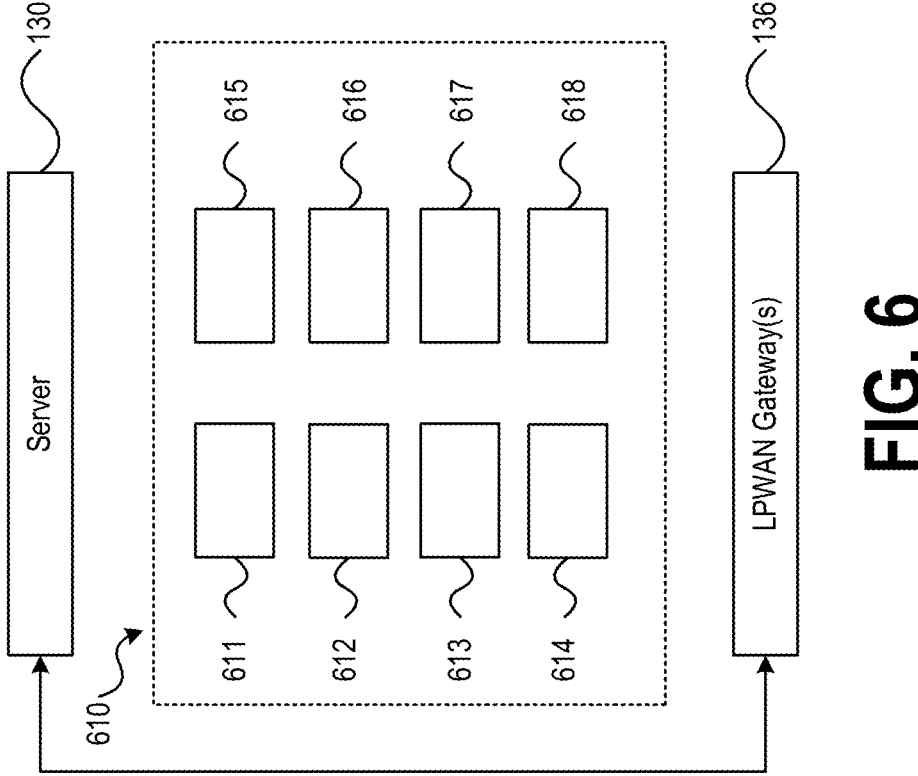
FIG. 6 is a block diagram illustrating additional aspects of an intelligent property management system configured in accordance with embodiments of the present disclosure.

Referring to FIG. 6, a block diagram illustrating additional aspects of an intelligent property management system configured in accordance with embodiments of the present disclosure is shown. As shown in FIG. 6, a multi-family residential property 610 may include a plurality of buildings 611, 612, 613, 614, 615, 616, 617, 618, each building having one or more floors and each floor having at least one apartment. As described an illustrated with respect to FIG. 5, each of the apartments may include a smart hub (e.g., smart thermostat hub 200 of FIG. 2, smart hub 300 of FIG. 3, or the modular smart thermostat hub 400 of FIG. 4), a smart door lock, and other smart devices. Each of smart hubs associated with the apartments of the buildings 611, 612, 613, 614, 615, 616, 617, 618 may communicate with a server 130 providing a management platform that provides various advantageous features for managing a multi-family residential property.

As illustrated in FIG. 6, intelligent property management systems in accordance with embodiments of the present disclosure may include one or more network gateways 620 in conjunction with server 130. The one or more network gateways 620 may be configured to communicatively couple one or more smart hubs to server 130 via a LPWAN and/or to provide overlapping coverage areas for failover purposes. For example, the communication capabilities of the communication links may degrade in some environments or conditions, such as environments with many buildings. In such cases, providing the one or more network gateways 620 may ensure that all smart hubs deployed in a multi-family residential property are communicatively coupled to server 130. In an embodiment, the network gateway(s) 620 may be communicatively coupled to server 130 via a wired communication link (e.g., an Ethernet communication link) or wireless communication link (e.g., a mobile hotspot or other wireless access point providing the gateway with network-based access to server 130). In an embodiment, utilizing the one or more network gateways 620 may enable server 130 to be located at a location other than the multi-family residential property, such as at a corporate office of an entity that owns the multi-family residential property or at another location, or to enable the functionality provided by the server 130 to be access from the cloud. In such instances, access to the property management platform provided by server 130 may be facilitated through a web-based interface, which may be provided by the cloud-based service 152 of FIG. 1.

Figure 7:
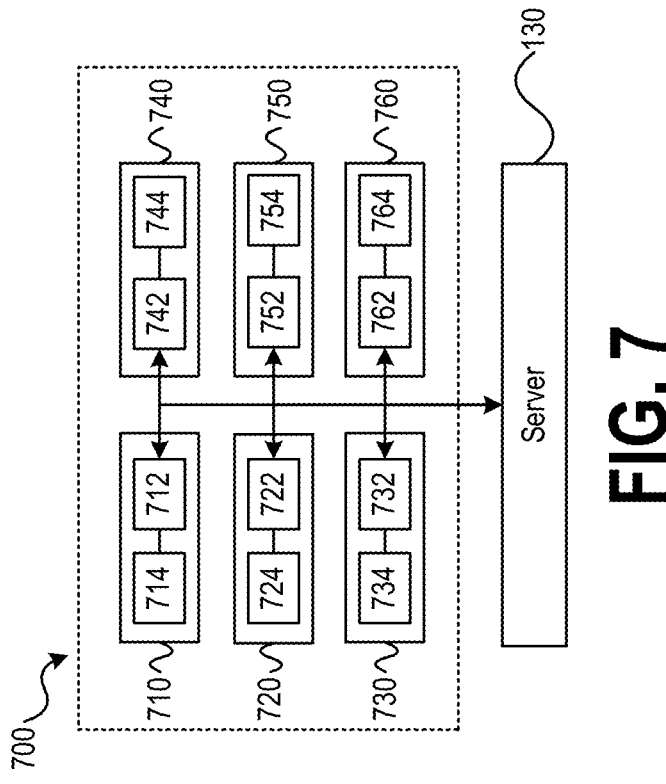
FIG. 7 is a block diagram illustrating additional aspects of an intelligent property management system configured in accordance with embodiments of the present disclosure.

Referring to FIG. 7, a block diagram illustrating additional aspects of an intelligent property management system configured in accordance with embodiments of the present disclosure is shown. As shown in FIG. 7, a multi-family residential property 700 may include a plurality of buildings 710, 720, 730, 740, 750, 760, each building having one or more floors and each floor having at least one apartment or residential unit. As described an illustrated with respect to FIG. 5, each of the apartment units may include a smart hub (e.g., smart thermostat hub 200 of FIG. 2, smart hub 300 of FIG. 3, or the modular smart thermostat hub 400 of FIG. 4), a smart door lock, and other smart devices. Each of the smart hubs associated with the apartment units of the buildings 710, 720, 730, 740, 750, 760 may communicate with server 130, which provides a property management platform that provides various features for managing a multi-family residential property, as described above with reference to FIGS. 1-4.

Although not wired and/or wireless communication infrastructure, such as Wi-Fi is not necessary to facilitate operation of intelligent property management systems in accordance with the embodiments disclosed herein, such features may provide additional capabilities when present. For example, as illustrated in FIG. 7, a plurality of access points 712, 722, 732, 742, 752, and 762 may be communicatively coupled to server 130 via wired communication links (e.g., Ethernet, etc.) and/or wireless communication links (e.g., Wi-Fi communication links). The bandwidth capabilities provided by the access points 712, 722, 732, 742, 752, and 762 may enable the intelligent property management system to provide video capabilities for improved security. For example, in FIG. 7, each of the buildings 710, 720, 730, 740, 750, and 760 may be equipped with one or more video cameras 714, 724, 734, 744, 754, and 764, respectively. The video cameras 714, 724, 734, 744, 754, and 764 may be communicatively coupled to server 130 via the access points 712, 722, 732, 742, 752, and 762, respectively, to facilitate video monitoring of areas of the multi-family residential property 700, as described above with respect to FIG. 5.

Referring to FIG. 8, a flow diagram illustrating an exemplary method for securing smart devices within an apartment of a multi-family residential property in accordance with embodiments of the present disclosure is shown as method 800. In an embodiment, steps of the method 800 may be stored as instructions that, when executed by one or more processors, cause the one or more processors to perform operations for securing smart devices within an apartment of a multi-family residential property, as described above with reference to FIGS. 1-7. It is noted that the method 800 may be performed by smart hub 110 of FIG. 1, smart thermostat hub 200 of FIG. 2, smart hub 300 of FIG. 3, and the modular smart thermostat hub 400 of FIG. 4.

As shown in FIG. 8, the method 800 may include, at step 810, receiving, by one or more processors of a smart thermostat hub, control information associated with a smart door lock from a property management platform via a LPWAN or other long range communication link where the control information identifies one or more access credentials to be disabled with respect to the smart door lock. At a step 820, the method 800 may include generating, by the one or more processors of smart thermostat hub, a command configured to disable the one or more access credentials identified in the control information. In a step 830, the method 800 may include transmitting, by the one or more processors, the command to the smart door lock via a short-range or non-LoRa-based/non-LPWAN-based communication link (e.g., a WPAN). As described above with reference to FIGS. 1-7, by using a smart thermostat hub in accordance with embodiments of the present disclosure, the method 800 may provide improved security for residents of a multi-family residential property, such as by facilitating access credentials for a smart door lock to be disabled remotely, rather than requiring property management personnel to visit the apartment and couple an external device to the smart door lock.

It is noted that the concepts of method 800 may further facilitate additional advantageous operations. For example, instead of receiving control information for disabling access credentials of the smart door lock, smart thermostat hub may receive control information configured to control operations of a thermostat, a light fixture, or another smart device present in an apartment where smart thermostat hub is located, or may receive control information configured to retrieve status information from a memory of the smart door lock. In a manner similar to steps 810 and 820, this additional control information may be received via a LPWAN-based communication link and may cause smart thermostat hub to generate one or more commands for controlling operation of smart devices identified by the control information, as described above with reference to FIGS. 1-7. After the one or more commands associated with the additional control information are generated, the smart thermostat hub may transmit the one or more additional commands to the appropriate smart devices via a short-range or non-LoRa-based communication link. Utilizing a smart thermostat hub and LoRa-based communication links to provide control information to smart devices may reduce the cost of deploying an intelligent property management system, such as the intelligent property management system described above with reference to FIG. 1. In aspects, the method 800 may also be utilized to create access credentials for one or more smart door locks, remotely unlock a smart door lock, or other operations described above with reference to FIGS. 1-7.

Referring to FIG. 9, a flow diagram of an exemplary method for retrieving access log data from a smart door lock is shown as a method 900. In an embodiment, steps of the method 900 may be stored as instructions that, when executed by one or more processors, cause the one or more processors to perform operations for securing smart devices within an apartment of a multi-family residential property, as described above with reference to FIGS. 1-7. It is noted that the method 900 may be performed by smart hub 110 of FIG. 1, smart thermostat hub 200 of FIG. 2, smart hub 300 of FIG. 3, and the modular smart thermostat hub 400 of FIG. 4.

At step 910, the method 900 includes transmitting, by one or more processors of a smart thermostat hub, an access log request to a smart door lock via a short-range or non-LoRa-based communication link (e.g., a WPAN). The access log request may be configured to retrieve at least a portion of access log information stored at a memory of the smart door lock. As described above with reference to FIG. 1, smart thermostat hub may be configured to transmit the access log request to the smart door lock in response to control information received from a property management platform (e.g., the property management platform provided by server 130 of FIGS. 1, 5, 6, and 7) and the control information may specify the portion of the access log to be retrieved. At step 920, the method 900 may include receiving, by the one or more processors of smart thermostat hub, at least the portion of the access log information from a lock processor of the smart door lock via the non-LoRa-based communication link and at step 930, the method 900 may include transmitting, by the one or more processors of smart thermostat hub, at least the portion of the access log information to the property management platform via a LPWAN-based communication link. As described above, transmission of at least the portion of the access log information to the property management platform may be performed periodically, and may also be performed based on scheduling information received from the property management platform.

It is noted that operations of the method 900 may improve the security of residents of a multi-family residential property. For example, as described above with reference to FIGS. 1 and 5, if residents are not sure they locked the door to their apartment after they leave, the residents may access a cloud-based service (e.g., the cloud-based service 152 of FIG. 1) to determine whether they locked the door or not. The cloud-based service may be configured to communicate with the property management platform to initiate operations of the method 900 to obtain a current status of the smart door lock and provide that status to the resident(s). If the door was found to be unlocked, the resident may contact the property management office to request that property management personnel visit the apartment and secure the smart door lock.

Referring to FIG. 10, a flow diagram illustrating an exemplary method for securing a smart door lock of an apartment of a multi-family residential property in accordance with embodiments of the present disclosure is shown as method 1000. In an embodiment, steps of the method 1000 may be stored as instructions that, when executed by one or more processors, cause the one or more processors to perform operations for securing a smart door lock of an apartment of a multi-family residential property, as described above with reference to FIGS. 1-5. In an embodiment, the method 1000 may be performed by a smart door lock, such as the smart door lock 1200 of FIG. 12.

The method 1000 may include, at step 1010, receiving, by a lock processor of a smart door lock, a command via a non-LoRa-based/non-LPWAN-based (e.g., WPAN) communication link. As described above with reference to FIGS. 1 and 5, as well as FIG. 8, the command may be received from a smart thermostat hub, and may include information for disabling one or more access credentials associated with the smart door lock. At step 1020, the method 1000 may include modifying, by the lock processor, access credential validation information stored at a memory of the smart door lock to disable the one or more access credentials based on the command. As disclosed herein, modifying access credential validation information may include deleting a portion of access credential validation information corresponding to the one or more access credentials identified in the control information. Additionally or alternatively, modifying access credential validation information may include configuring one or more flags corresponding to the one or more access credentials identified in the control information to have a particular flag value. The one or more flags may be stored with access credential validation information and the particular flag value may indicate a corresponding access credential is disabled.

At step 1030, the method 1000 may include receiving, by a sensor of the smart door lock, access credential information from a credential device placed in proximity to the sensor. As described herein, the credential device may include a smartphone, a fob, a smartcard or another type of device provided with an access credential. At step 1040, the method 1000 may include determining, by the lock processor, a validity of access credential information based on whether access credential validation information indicates access credential information is valid or disabled and at step 1050, the method 1000 may include engaging, in response to a determination that access credential is valid, a locking mechanism of the smart door lock such that the locking mechanism is configurable to change between locked state and an unlocked state. It is noted that the method 1000 may provide functionality that is complimentary to the functionality provided by the method 800. Additionally, as described above with reference to FIGS. 1-6, providing an intelligent property management system that includes a smart thermostat hub to enable access credentials for smart locks to be remotely disabled in accordance with the method 1000 provides improved security for residents of a multi-family residential property, such as by facilitating access credentials for a smart door lock to be disabled remotely, rather than requiring property management personnel to visit the apartment and couple an external device to the smart door lock. Further, it is noted that although the method 1000 is described as providing functionality for disabling access credentials, the method 1000 may also be utilized to provide other functionality described herein with respect to operations of a smart door lock in accordance with aspects of the present disclosure, such as authorize new credentials.

Referring to FIG. 11, a flow diagram illustrating an exemplary method for securing a smart door lock of an apartment of a multi-family residential property in accordance with embodiments of the present disclosure is shown as method 1100. In an embodiment, steps of the method 1100 may be stored as instructions that, when executed by one or more processors, cause the one or more processors to perform operations for securing a smart door lock of an apartment of a multi-family residential property, as described above with reference to FIGS. 1 and 5. In an embodiment, the method 1100 may be performed by a smart door lock, such as the smart door lock 1200 of FIG. 12.

At step 1110, the method 1100 may include storing, by a lock processor of a smart door lock, access log information at a memory of the smart door lock. As disclosed herein, the access log may comprise access credential information associated with access credentials presented to the sensor and/or status information identifying changes to a state of a locking mechanism of the smart door lock. Additionally, the access log information may comprise time stamps associated with the time that particular information was recorded to the access log. At step 1120, the method 1000 may include receiving, by the lock processor, an access log request via a non-LoRa-based/non-LPWAN-based (e.g., WPAN) communication link. At step 1130, the method 1100 may include transmitting, by the lock processor, at least the portion of the access log information to a smart thermostat hub via the non-LoRa-based communication link. As described above with respect to FIGS. 1 and 5, the access log request may be received by the lock processor from a smart thermostat hub that is in communication with a property management platform, and the request for access log information may ultimately be provided to the property management platform or another destination, such as a graphical user interface associated with the cloud-based service 152 of FIG. 1.

It is noted that the method 1100 provides functionality that is complimentary to, and may be used on coordination with, the functionality provided by the method 900. For example, as described above with reference to FIGS. 1 and 5, if residents are not sure they locked the door to their apartment after they leave, the residents may access a cloud-based service (e.g., the cloud-based service 152 of FIG. 1) to determine whether they locked the door or not. The cloud-based service may be configured to communicate with the property management platform to initiate operations of the method 900 to obtain a current status of the smart door lock and provide that status to the resident(s). If the door was found to be unlocked, the resident may contact the property management office to request that property management personnel visit the apartment and secure the smart door lock. Thus, it is to be appreciated that the operations of the method 1100, individually or in coordination with other processes, such as the method 900 described with reference to FIG. 9, may improve the security of residents of a multi-family residential property.

Figure 12:
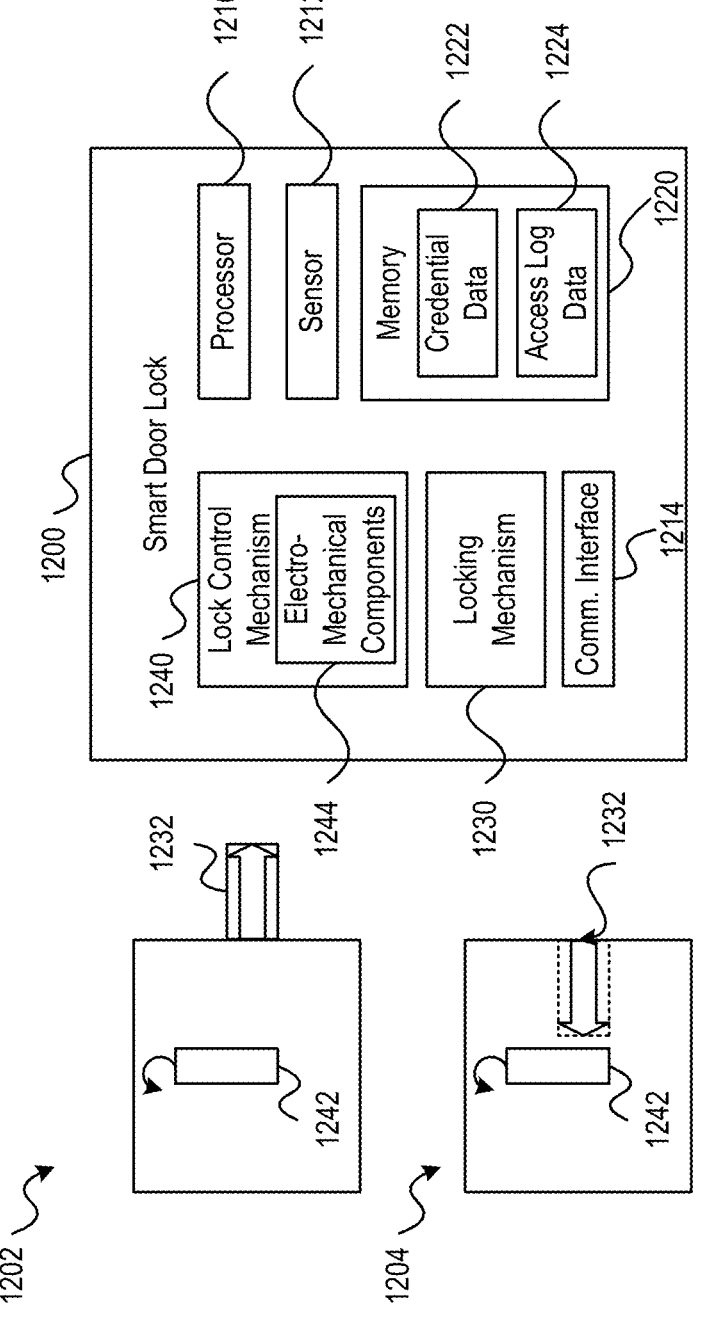
FIG. 12 is a block diagram illustrating exemplary features of a smart door lock configured in accordance with embodiments of the present disclosure.

Referring to FIG. 12, a block diagram illustrating exemplary features of a smart door lock configured in accordance with embodiments of the present disclosure is shown as a smart door lock 1200. As shown in FIG. 12, the smart door lock 1200 may include a lock processor 1210, a sensor 1212, a communication interface 1214, a memory 1220, a locking mechanism 1230, and a lock control mechanism 1240. The sensor 1212 may be configured to receive access credential information from a credential device placed in proximity to the sensor 1212. For example, the sensor 1212 may be configured to utilize near field communication (NFC) or Bluetooth communication to receive access credentials from an credential device (e.g., a resident's smartphone, a fob, a smartcard, and the like). Communication interface 1214 may be configured to communicatively couple the smart door lock 1200 to smart hub 110 via a short-range or WPAN (e.g., non-LPWAN) communication link, such as a Bluetooth communication link, for example. In an embodiment, the sensor 1212 may be omitted and the communication interface 1214 may be configured to utilize one or more WPAN communication links, such as a Bluetooth communication link, a Zigbee or Z-Wave communication link, and/or other types of short-range communication links, to communicate with a smart thermostat hub and/or to receive, disable, or otherwise manage access credentials, as described herein.

In an embodiment, communication interface 1214 may include one or more LPWAN communication interfaces configured to communicatively couple the smart door lock 1200 directly to a remote system, such as a property management platform configured in accordance with embodiments of the present disclosure. In such an embodiment, rather than communicating with a smart hub to perform various operations with respect to the smart door lock 1200, as described above, the property management platform, which may be provided via server 130 of FIG. 1, may communicate control information directly to smart door lock 1200 via a gateway (e.g., network gateway 136 of FIG. 1) within the LPWAN, such as to retrieve at least a portion of the log information maintained by smart door lock 1200, manage access credentials associated with smart door lock

1200, or other operations described herein. In some implementations, the gateway may be a LPWAN gateway device, such as a LoRaWAN gateway device, or in other implementations a cellular gateway device, that supports low-power long-range radio communication between server 130 and the smart door lock 1200 or other smart devices. Because smart door lock 1200 includes, at least in the embodiment described in this example, a LPWAN-based communication interface, smart door lock 1200 may be able to bi-directionally communicate with the property management platform, such as to transmit a requested portion of the access log information to the property management platform via a LPWAN gateway using LPWAN communication links, as described above and as will be described in further detail below with respect to FIG. 14.

As shown in FIG. 12, memory 1220 of the smart door lock 1200 may store access credential validation information 1222 and access log data 1224. Additional aspects of access credential validation information 1222 and the access log data are described in more detail above with reference to FIGS. 1-6. As described above, the lock processor 1210 may be configured to determine a validity of access credential information presented to the sensor 1212 (or the communication interface 1214) based on the access credential validation information 1222. Additionally, the lock processor 1210 may be configured to selectively engage the lock control mechanism 1240 based on whether access credential is valid.

In an embodiment, the locking mechanism 1230 comprises a deadbolt 1232 and the lock control mechanism 1240 may comprise a rotatable member 1242. In other implementations, the deadbolt 1232 may be replaced with a different type of locking mechanism, such as one or more pins of a tubular lock or one or more pins or levers of a mortise lock. The locking mechanism 1230 may be configurable to change between the locked state and the unlocked state via rotation of the rotatable member. For example, in response to successful authentication of access credentials presented to the sensor 1212 (e.g., the presented access credential information is determined to be valid), the lock processor 1210 may engage the lock control mechanism 1240, and the engagement of the lock control mechanism 1240 may facilitate interaction between the lock control mechanism 1240 and the locking mechanism 1230. For example, engagement of the lock control mechanism 1240 may configure the rotatable member 1242 such that rotation of the rotatable member 1242 in a first direction drives the deadbolt 1232 to a first position corresponding to the locked state, as shown at 1202, and rotation of the rotatable member 1242 in a second direction drives the deadbolt 1232 to a second position corresponding to the unlocked state, as shown at 1204. The lock processor 1210 may be configured to ignore invalid or disabled credentials. In such instances, interaction between the lock control mechanism 1240 and the locking mechanism 1230 may be prohibited. For example, when an invalid or disabled credential is presented, the lock control mechanism 1240 may not be engaged by the lock processor 1210 in response to receipt of an invalid access credential and the locking mechanism 1230 may be maintained in a current state (e.g., either the locked state or the unlocked state). In such instances, the rotatable member 1242 may freely rotate without impacting the locking mechanism 1230. As another example, rotation of the rotatable member 1242 may be prevented, thereby causing the lock control mechanism to maintain a current state (e.g., either the locked state or the unlocked state). Thus, in the absence of engagement of the locking mechanism 1230, the locking mechanism 1230 may remain in the locked state or the unlocked state (e.g., until a valid credential is presented).

In an embodiment, the lock control mechanism 1240 may include one or more electro-mechanical components 1244, such as one or more circuits, motors, actuators, gears, or other components, configured to electrically, mechanically, or electro-mechanically configure the locking mechanism 1230 to change between the locked state and the unlocked state. For example, in response presentation of a valid access credential, the one or more electro-mechanical components 1244 may be activated to automatically drive the deadbolt 1232 to the first position or the second position. In response to presentation of an invalid access credential, the one or more electro-mechanical components may be configured to maintain the locking mechanism 1230 in a current state (e.g., the deadbolt 1232 may be maintained at the first position or the second position). In embodiments comprising a smart door lock 1200 that includes electro-mechanical components 1244, the smart door lock 1200 may further include a power supply, such as a battery or other power source, configured to supply operational power to the electro-mechanical components 1244.

In addition to controlling the electro-mechanical components 1244 in response to valid access credentials, in an embodiment, the lock processor 1210 may be configured to activate or otherwise control the electro-mechanical components 1244 to configure the locking mechanism 1230 to change between the locked state and the unlocked state in response to commands received via a short-range or wireless personal area network (WPAN) communication link, such as commands received from a smart hub configured in accordance with embodiments of the present disclosure. As described above, the smart hub may be configured to generate such commands (e.g., lock commands and/or unlock commands) responsive to control information provided by a property management platform (e.g., the system 100 of FIG. 1) via a LPWAN communication link (e.g., via server 130 and network gateway 136 of FIG. 1). Additionally, the control information received at the smart hub may be generated by the property management platform in response to information received via a user interface, such as the user interface described above that allows a resident (or property management personnel) to verify a status of the smart door lock as locked or unlocked. For example, if a status check indicates the smart door lock is unlocked, a request may be initiated from the user interface to property management platform to lock the smart door lock. In response to such a request, control information identifying the smart door lock and including an instruction to configure the smart door lock to the locked state may be communicated to the appropriate smart hub via the LPWAN communication link and then the commands may be provided from the smart hub to the smart door lock via a short-range or WPAN communication link (e.g., non-LPWAN communication link), such as a Bluetooth low energy (BLE) communication link, a Zigbee communication link, a Z-wave communication link, etc.

In an embodiment, the smart door lock 1200 may not be configured to facilitate the use of remote unlock commands irrespective of whether the smart door lock 1200 includes the electro-mechanical components 1244. For example, although access credentials may be disabled or enabled/provided via commands received from a smart hub in response to control information transmitted to the smart hub by a property management platform, the smart door lock 1200 may be prevented from enabling the locking mechanism to change between the locked state and the unlocked state via commands received from the smart hub. In this example, the smart door lock 1200 may only enable the locking mechanism to change between the locked state and the unlocked state when a valid access credential is received (e.g., via the sensor 1212 or the communication interface 1214) from a user device (e.g., smartphone, etc.) or third party device (e.g., a fob, a smartcard, etc.).

Figure 13:
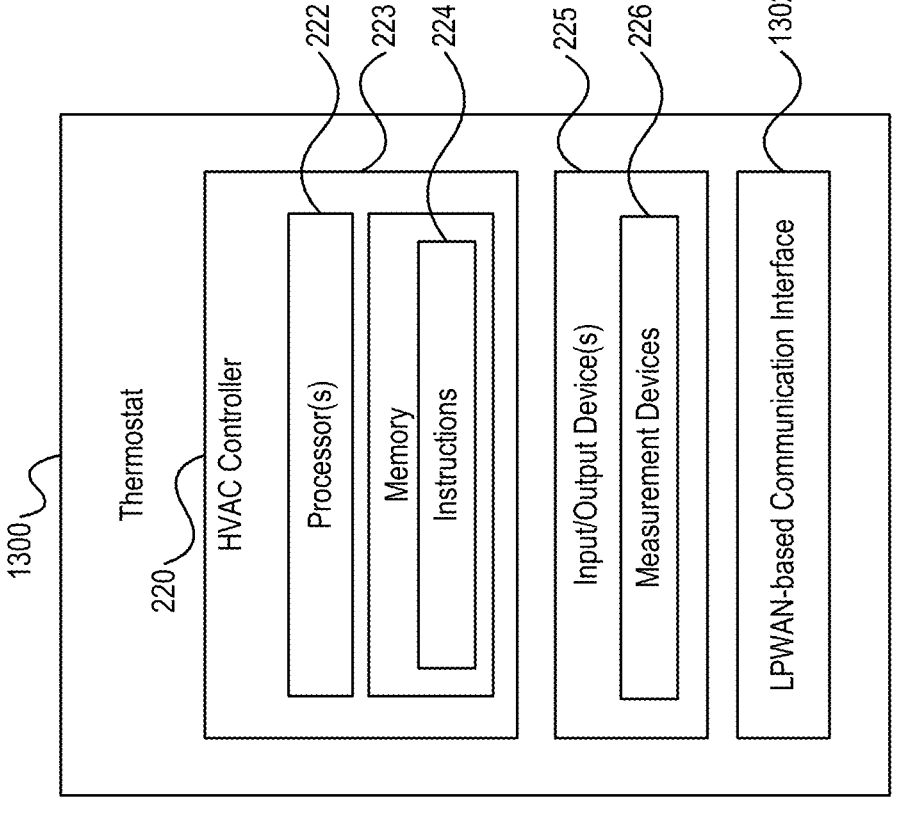
FIG. 13 is a block diagram illustrating an embodiment of a smart thermostat in accordance with embodiments of the present disclosure.

Referring to FIG. 13, a block diagram illustrating an example of a smart thermostat 1300 in accordance with embodiments of the present disclosure. As shown in FIG. 13, the smart thermostat 1300 may include the components illustrated with respect to the thermostat component 410 of FIG. 4, however, rather than including the smart hub interface 412, the smart thermostat 1300 may include a communication interface 1302. In such an embodiment, the smart thermostat 1300 may be communicatively coupled to a property management platform (e.g., the system 100 of FIG. 1) via a LPWAN-based communication link, and may receive control information from the property management platform directly, as opposed to receiving commands derived from control information by a smart hub. Such a direct communication link may enable operational aspects of the smart thermostat 1300 to be configured, such as temperature settings, operating modes, and the like as described above, to be configured via control information provided by the property management platform (e.g., via server 130 and network gateway 136 of FIG. 1) without requiring a smart hub to be provided in proximity to or in connection with the smart thermostat 1300. In this manner, the advantages provided by utilizing a smart hub to control a thermostat, such as to place the thermostat into vacant mode or other advantageous operations, may be provided by the smart thermostat 1300 directly, thereby providing a more cost effective solution for situations where the additional functionality provided by the smart hub (e.g., short-range communication with smart door locks and other smart devices) may not be desired or practical.

Figure 14:
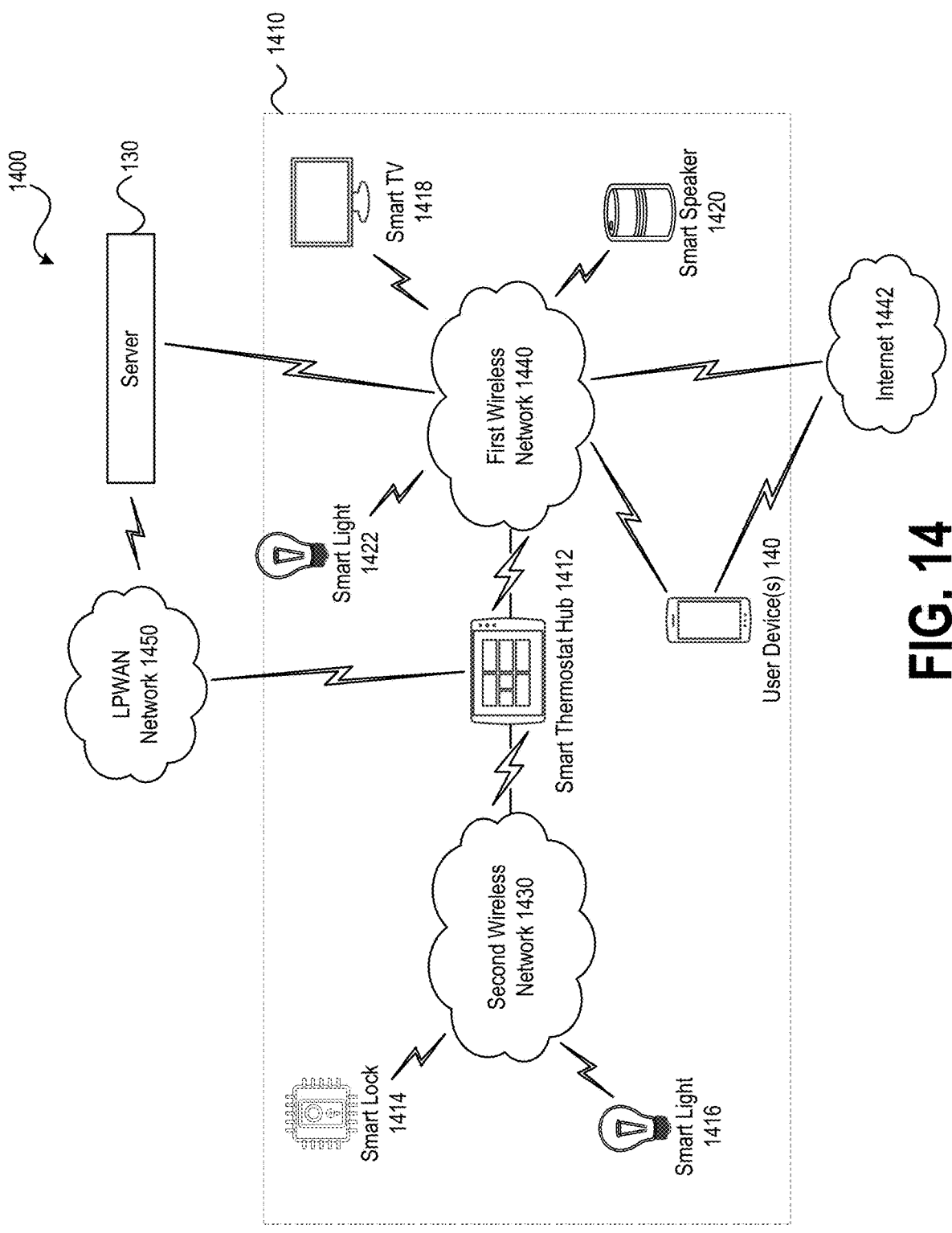
FIG. 14 is a block diagram of a system for managing and controlling smart devices using a low power, wide area network (LPWAN) backhaul connection to establish another backhaul connection via a wireless network within a unit of a multi-family residential property in accordance with embodiments of the present disclosure.

FIG. 14 is a block diagram of an illustrative system 1400 for managing and controlling smart devices using a private wireless network and a public wireless network within a unit of a multi-family residential property in accordance with embodiments of the present disclosure. For discussion purposes, system 1400 will be described with reference to various components of system 100 of FIG. 1, as described above, but system 1400 is not intended to be limited thereto.

As shown in FIG. 14, system 1400 includes a smart thermostat hub 1412 of a unit 1410 of the multi-family residential property that communicates with smart devices within unit 1410 via short-range communications and with a server 130 via LPWAN communications. As described above, server 130 may be used to provide a property management platform for remotely managing and controlling the smart devices associated with unit 1410, and smart thermostat hub 1412 may be communicatively coupled to server 130 via a LPWAN network 1450. LPWAN network 1450 may include a low power, wide range (or long-range) wireless communication network. As non-limiting examples, LPWAN network 1450 may include a LoRaWAN network or a low power cellular network (e.g., LTE-M or LTE-MTC). As other example, LPWAN network 1450 may include or correspond to a NB-IoT network, a Sigfox-based network, a Weightless network, a DASH7 network, a Wize network, a CSS-based network, a MIoTy network, an IEEE 802.11ah network, or the like. Unit 1410 may be one of a plurality of units within the multi-family residential property, where each unit has its own smart thermostat hub and associated smart devices, e.g., as described above with respect to FIG. 5. Unit 1410 may represent, for example, an apartment or residential unit (e.g., apartment 520 of FIG. 5) of a resident within the multi-family residential property or a designated common area or facility of the property (e.g., a fitness center, a laundry room, a clubhouse, etc.) used by various residents. As other examples, unit 1410 may include a room in a dormitory or campus housing building, a room or unit of a hotel or other short term rental property, a unit of one or more condominiums, or the like. Unit 1410 may be one of a plurality of units of the multi-family residential property, where each unit may have its own smart hub and associated smart devices. In some implementations, smart thermostat hub 1412 is a smart thermostat hub (e.g., smart thermostat hub 200 of FIG. 2 or modular smart thermostat hub 400 of FIG. 4, as described above) installed on an interior wall of unit 1410. In such implementations, smart thermostat hub 1412 is capable of controlling one or more thermostat settings in addition to communicating with other smart devices and server 130. In some other implementations, smart thermostat hub 1412 may be a smart device hub that communicates with a smart thermostat device and other smart devices. User device(s) 140 in this example may be a mobile device associated with a resident of the multi-family residential property. As will be described in further detail below, the resident may use an application executed by user device 140 to remotely control one or more smart devices of unit 1410 via a communication interface of smart thermostat hub 1412. Such smart devices may include, for example, a smart lock 1414, a smart light 1416, a wireless or Internet of Things (IoT) camera (not shown, e.g., a webcam or a wireless security camera that can be remotely controlled by the property manager via server 130 or by the resident via user device 140), and a smart thermostat integrated with or coupled to smart thermostat hub 1412. Additionally, or alternatively, a resident may bring their own smart devices to use within unit 1410, such as a smart television (TV) 1418, a smart speaker 1420, and a smart light 1422, as non-limiting examples, and the resident may control those devices using user device 140. In some implementations, as further described herein, such resident-owned smart devices may be connected to a first wireless network 1440 within unit 1410 that also provides connectivity to Internet 1442 and server 130.

Server 130 may be communicatively coupled to LPWAN network 1450 to enable communication with devices within unit 1410, such as in some implementations via a gateway that relays communications between server 130 and other devices (including smart thermostat hub 1412 and user device 140) over LPWAN network 1450. The gateway may be separate from LPWAN network 1450 or may be an LPWAN gateway within LPWAN network 1450 that is communicatively coupled to server 130. For example, the gateway may be a LoRa gateway device outside of or within LPWAN network 1450 that enables low-power long-range radio communications utilizing low-power or LoRa-based communication links (e.g., based on LoRa or NB-IoT technology standards) between server 130 and other devices via LPWAN network 1450. However, it should be appreciated that embodiments are not limited thereto and that any of various network gateways may be used as appropriate or desired for a particular implementation. For example, in some other implementations, server 130 may be communicatively coupled to a cellular gateway that relays communications via a cellular network to smart thermostat hub 1412, such as according to an LTE-M or LTE-MTC technology standard. Additionally, or alternatively, server 130 may also be capable of communicating with smart thermostat hub 1412 via other wireless networks supported by or communicatively coupled to smart thermostat hub 1412, as further described below. As described above, server 130 may provide a property management platform that is connected to smart thermostat hub 1412, and thus devices within unit 1410, via an LPWAN backhaul (e.g., LPWAN network 1450 and respective connections).

Smart thermostat hub 1412 may be configured to be communicatively coupled to one or more networks within unit 1410, such as first wireless network 1440 and second wireless network 1430. First wireless network 1440 may be deployed and maintained to provide network connectivity for a first set of one or more smart devices (and other networked devices) that are brought to unit 1410 by the resident. For example, a resident may bring network infrastructure such as a cable model, a wireless router, power cabling, network extenders, or the like, to establish a wireless network in unit 1410. Additionally, or alternatively, a wireless network may be installed for one or more units of the multi-family residential property, such as a Wi-Fi network being deployed by the property manager at a Class A property. First wireless network 1440 may be implemented using various wireless communication protocols and technologies. As non-limiting examples, first wireless network 1440 may include or correspond to a short-range wireless network, such as a personal area network (PAN), a Bluetooth network, a BLE network, a Zigbee network, a Z-Wave network, a Matter or Matter-compliant network, a Thread or Thread-compliant network, another type of short-range wireless network, or the like. Alternatively, first wireless network 1440 may include or correspond to a Wi-Fi network. In the example shown in FIG. 14, the first set of smart devices that are communicatively coupled to first wireless network 1440 includes one or more smart TVs (e.g., smart TV 1418), one or more smart speakers (e.g., smart speaker 1420), and one or more smart lights (e.g., smart light 1422), as well as other smart devices (not shown), such as one or more smart assistants, one or more smart appliances, one or more smart cleaning devices, one or more smart shades, one or more entertainment systems, one or more video doorbells, other smart or IoT devices, one or more cameras, one or more security devices, or any combination thereof. Second wireless network 1430 may be deployed and maintained (e.g., by the property manager) to support wireless communications between smart thermostat hub 1412 and a second set of one or more smart devices within unit 1410 that are installed, owned, or otherwise associated with the property manager. As non-limiting examples, second wireless network 1430 may include or correspond to a short-range wireless network, such as a PAN, a Bluetooth network, a BLE network, a Zigbee network, a Z-Wave network, a Matter or Matter-compliant network, a Thread or Thread-compliant network, another type of short-range wireless network, or the like. Alternatively, second wireless network 1430 may include or correspond to a Wi-Fi network. Thus, first wireless network 1440 and second wireless network 1430 may be configured according to a same wireless communication protocol (e.g., first wireless network 1440 and second wireless network 1430 may be the same type of wireless network) or according to different wireless communication protocols (e.g., first wireless network 1440 may be a different type of wireless network than second wireless network 1430). For example, first wireless network 1440 and second wireless network 1430 may both be Wi-Fi networks, or first wireless network 1440 may be a Wi-Fi network and second wireless network 1430 may be a Z-Wave network. In the example shown in FIG. 14, the second set of smart devices that are communicatively coupled to second wireless network 1430 includes one or more smart locks (e.g., smart lock 1414), one or more smart lights (e.g., smart light 1416), and optionally one or more wireless or IoT cameras or other smart devices (not shown). To further illustrate, when the property manager readies unit 1410 to be rented, the property manager may install particular smart devices within unit 1410 that are provided for the resident's use but that are intended to remain within unit 1410 after the resident moves out. In some implementations, user device 140 may remotely control devices connected to first wireless network 1440 via a direct connection to first wireless network 1440 (as shown in FIG. 14) or via direct connections to the smart devices, such as via a short range or point-to-point connection. Alternatively, user device 140 may access the Internet 1442, such as via a Wi-Fi or cellular communication protocol, in order to communicate with and control the devices connected to first wireless network 1440. Additionally or alternatively, server 130 may be configured to provide a platform for controlling smart devices coupled to second wireless network 1430, and optionally first wireless network 1440, and user device 140 may access first wireless network 1440 (and Internet 1442) to communicate with server 130 to make use of the services being offered.

In some implementations, first wireless network 1440 may be deployed and maintained by the property manager via smart thermostat hub 1412. For example, first wireless network 1440 may be a short-range wireless network supported by smart thermostat hub 1412. Alternatively, the multi-family residential property may have a higher-bandwidth network installed on the premises, such as a Wi-Fi network, and the smart thermostat hub 1412 may be configured to communicate with the installed network as first wireless network 1440. Alternatively, a resident may bring their own network infrastructure and equipment to deploy first wireless network 1440, such as a Wi-Fi router or access point. In some implementations, upon communicative coupling of smart thermostat hub 1412 to first wireless network 1440, smart thermostat hub 1412 may communicate with server 130 via first wireless network 1140 (e.g., a Wi-Fi network) as a primary connection, and LPWAN network 1450 may be used as a backup or secondary connection to server 130. For example, smart thermostat hub 1412 may receive an initialization instruction from server 130 via LPWAN network 1450 and, responsive to receiving the initialization instruction, smart thermostat hub 1412 may initialize (e.g., establish or set up) a connection between smart thermostat hub 1412 and server 130 via first wireless network 1440. In some such implementations, particular communications may still be performed over the LPWAN communication link between smart thermostat hub 1412 and server 130, while other communications may be performed via first wireless network 1440. For example, communications related to management or control of the thermostat or smart thermostat hub 1412 itself and smart lock 1414 may be performed via LPWAN communication link in order to take advantage of the higher security provided by LPWAN network 1450 as compared to first wireless network 1440, while communications related to controlling other smart devices, particular cameras or other devices that provide streaming media data, may be performed via first wireless network 1440 in order to take advantage of the higher speed and bandwidth provided by first wireless network 1440.

Through the unique communication layout illustrated in FIG. 14, smart thermostat hub 1412 manage and control smart devices on behalf of server 130 via multiple backhaul connections. For example, smart thermostat hub 1412 may be configured to receive control information from server

130, such as via LPWAN network 1450 or first wireless network 1440, and to provide corresponding instructions or other communications to smart devices of second wireless network 1430 or first wireless network 1440 based on the control information. In an example, control information that identifies smart lock 1414 and an unlock command may be received by smart thermostat hub 1412 from server 130 via LPWAN network 1450, and smart thermostat hub 1412 may generate and transmit an unlock command to smart lock 1414 via second wireless network 1430. As another example, control information that identifies smart light 1422 and a lighting setting may be received by smart thermostat hub 1412 from server 130 via first wireless network 1440, and smart thermostat hub 1412 may generate and transmit a command to smart light 1422 via first wireless network 1440 to cause smart light 1422 to set a power level based on the lighting setting. Other examples of operations are described above with reference to FIGS. 1-13. In another example, secure messages and notifications relating to an operating status or one or more operating settings of a smart device associated with unit 1410 may be transmitted from smart thermostat hub 1412 over LPWAN network 1450 or first wireless network 1440 and displayed via a graphical user interface (GUI) of a property management application executable at server 130, as will be described in further detail below with respect to FIG. 18. In yet another example, secure messages and notifications relating to an operating status or one or more operating settings of a smart device associated with unit 1410 may be transmitted from smart thermostat hub 1412 over LPWAN network 1450 or first wireless network 1440 and displayed via a GUI of a client or mobile application executable at user device(s) 140, as will be described in further detail below with respect to FIG. 17.

Figure 15:
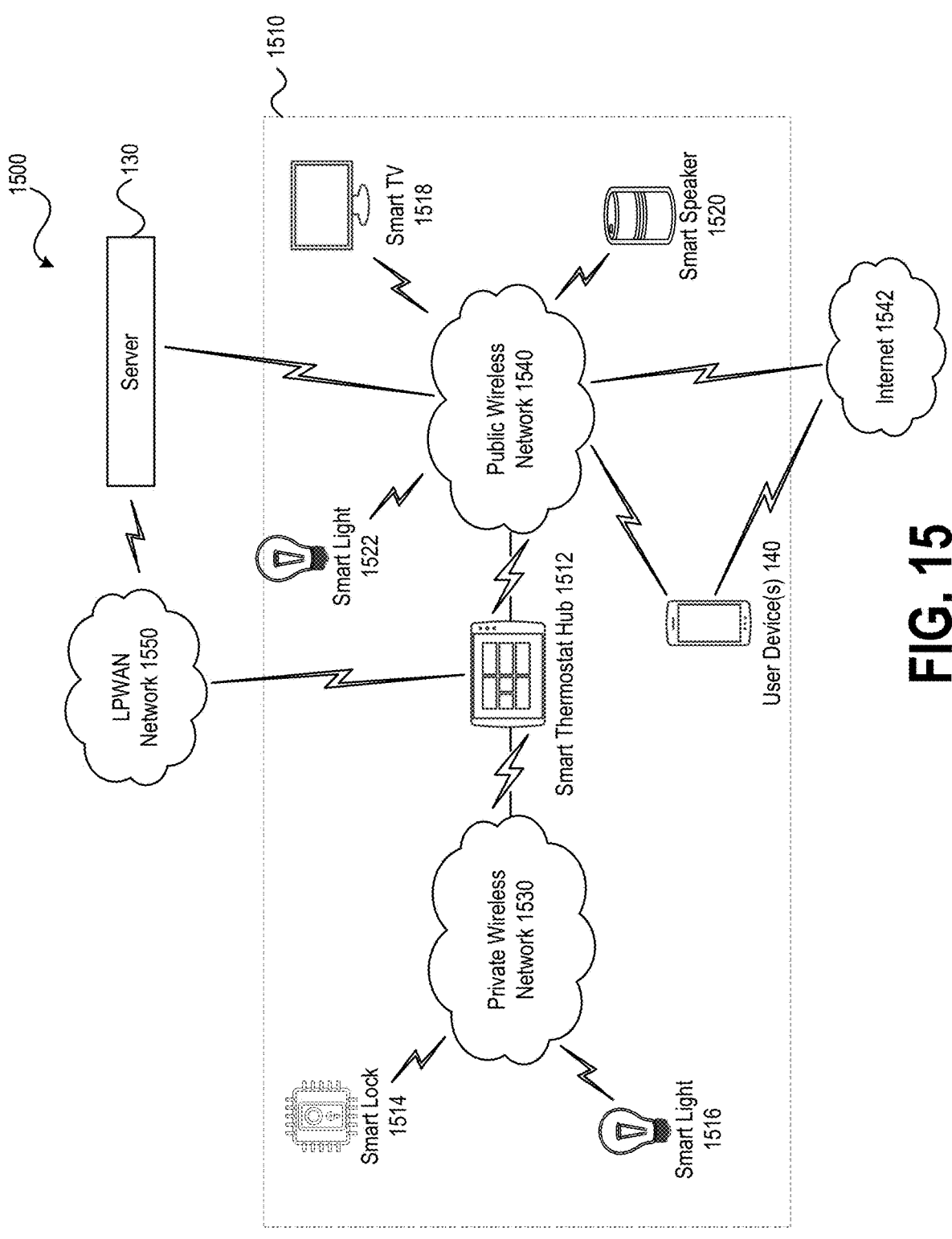
FIG. 15 is a block diagram of a system for managing and controlling smart devices using a private wireless network and a public wireless network within a unit of a multi-family residential property in accordance with embodiments of the present disclosure.

FIG. 15 is a block diagram of an illustrative system 1500 for managing and controlling smart devices using a private wireless network and a public wireless network within a unit of a multi-family residential property in accordance with embodiments of the present disclosure. For discussion purposes, system 1500 will be described with reference to various components of system 100 of FIG. 1 and system 1400 of FIG. 14, as described above, but system 1500 is not intended to be limited thereto.

As shown in FIG. 15, system 1500 includes a smart thermostat hub 1512 of a unit 1510 of the multi-family residential property that communicates with smart devices within unit 1510 via short-range communications and with a server 130 via LPWAN communications. As described above, server 130 may be used to provide a property management platform for remotely managing and controlling the smart devices associated with unit 1510, and smart thermostat hub 1512 may be communicatively coupled to server 130 via a LPWAN network 1550. LPWAN network 1550 may include a low power, wide range (or long-range) wireless communication network that includes any of the types of networks described above with reference to LPWAN network 1450. Unit 1510 may be one of a plurality of units within the multi-family residential property, where each unit has its own smart thermostat hub and associated smart devices, similar to as described above with respect to unit 1410. In some implementations, smart thermostat hub 1512 is a smart thermostat hub (e.g., smart thermostat hub 200 of FIG. 2 or modular smart thermostat hub 400 of FIG. 4, as described above) installed on an interior wall of unit 1510. In such implementations, smart thermostat hub 1512 is capable of controlling one or more thermostat settings in addition to communicating with other smart devices and server 130. In some other implementations, smart thermostat hub 1512 may be a smart device hub that communicates with a smart thermostat device and other smart devices. User device(s) 140 in this example may be a mobile device associated with a resident of the multi-family residential property, which may be used to remotely control one or more smart devices of unit 1510 via a communication interface of smart thermostat hub 1512, as further described below. Such smart devices may include, for example, a smart lock 1514, a smart light 1516, a wireless or Internet of Things (IoT) camera (not shown, e.g., a webcam or a wireless security camera that can be remotely controlled by the property manager via server 130 or by the resident via user device 140), and a smart thermostat integrated with or coupled to smart thermostat hub 1512. Additionally, or alternatively, a resident may bring their own smart devices to use within unit 1510, such as a smart TV 1518, a smart speaker 1520, and a smart light 1522, as non-limiting examples, and the resident may control those devices using user device 140. In some implementations, as further described herein, such resident-owned smart devices may be connected to a wireless network within unit 1510 that also provides connectivity to smart lock 1514 and smart light 1516.

Server 130 may be communicatively coupled to LPWAN network 1550 to enable communication with devices within unit 1510, as described above with reference to LPWAN network 1450. Such as in some implementations via a gateway that relays communications between server 130 and other devices (including smart thermostat hub 1512 and user device 140) over LPWAN network 1550. Additionally, or alternatively, server 130 may also be capable of communicating with smart thermostat hub 1512 via a public wireless network supported by or communicatively coupled to smart thermostat hub 1512, as further described below. As described above, server 130 may provide a property management platform that is connected to smart thermostat hub 1512, and thus devices within unit 1510, via an LPWAN backhaul (e.g., LPWAN network 1550 and respective connections).

Smart thermostat hub 1512 may support, or enable communication between, multiple wireless networks within unit 1510, such as a private wireless network 1530 and a public wireless network 1540. Private wireless network 1530 may be deployed and maintained to support wireless communications between smart thermostat hub 1512 and a first set of one or more smart devices within unit 1510 that are installed, owned, or otherwise associated with the property manager. As such, private wireless network 1530 is referred to as "private" to represent that access credentials and other information are maintained by the property manager and are not shared with resident(s) or others within unit 1510, such that limited access and permissions for networked devices may be provided to the resident(s), as further described below. As non-limiting examples, private wireless network 1530 may include or correspond to a Matter or Matter-compliant network or a Thread or Thread-compliant network. In the example shown in FIG. 15, the first set of smart devices that are communicatively coupled to private wireless network 1530 includes one or more smart locks (e.g., smart lock 1514), one or more smart lights (e.g., smart light 1516), and optionally one or more wireless or IoT cameras or other smart devices (not shown). To further illustrate, when the property manager readies unit 1510 to be rented, the property manager may install particular smart devices within unit 1510 that will be at least partially controllable or accessible to both the property manager and a new resident, and these smart devices are intended to remain within unit 1510 after the resident moves out. Smart thermostat hub 1512 is also configured to support or communicatively couple to public wireless network 1540. Public wireless network 1540 may be deployed and maintained to provide network connectivity for a second set of one or more smart devices (and other networked devices) that are brought to unit 1510 by the resident. As such, public wireless network 1540 is referred to as "public" to represent that access credentials and other information are available, or perhaps even provided, by resident(s) or others within unit 1510 and are not maintained only by the property manager, such that any level of access and permissions for networked devices may be available to the resident(s), as further described below. As non-limiting examples, public wireless network 1540 may include or correspond to a Matter or Matter-compliant network or a Thread or Thread-compliant network. In the example shown in FIG. 15, the second set of smart devices that are communicatively coupled to public wireless network 1540 includes one or more smart TVs (e.g., smart TV 1518), one or more smart speakers (e.g., smart speaker 1520), and one or more smart lights (e.g., smart lights 1522) as well as other smart devices (not shown), such as one or more smart assistants, one or more smart appliances, one or more smart cleaning devices, one or more smart shades, one or more entertainment systems, one or more video doorbells, other smart or IoT devices, one or more cameras, one or more security devices, or any combination thereof. In some implementations, user device 140 may remotely control devices connected to public wireless network 1540 via a direct connection to public wireless network 1540 (as shown in FIG. 15) or via direct connections to the smart devices, such as via a short range or point-to-point connection. Alternatively, user device 140 may access the Internet 1542, such as via a Wi-Fi or cellular communication protocol, in order to communicate with and control the devices connected to public wireless network 1540.

In some implementations, public wireless network 1540 may be deployed and maintained by the property manager via smart thermostat hub 1512. In some implementations, public wireless network 1540 is a higher-bandwidth network (as compared to LPWAN network 1550) that installed on the premises, and the smart thermostat hub 1512 may be configured to communicate with the installed network as public wireless network 1540. In some such implementations, upon communicative coupling of smart thermostat hub 1512 to public wireless network 1540, smart thermostat hub 1512 may receive an initialization instruction from server 130 via LPWAN network 1550 and initialize a connection with server 130 via public wireless network 1540 as a primary connection, as described above with reference to FIG. 14. In this example, LPWAN network 1550 may be used as a backup or secondary connection to server 130, such as if public wireless network 1540 is offline or otherwise unable to provide a connection between smart thermostat hub 1512 and server 130. In some other implementations, the resident may bring their own network hardware or components, such as a Wi-Fi router or access point, that makes up the infrastructure of public wireless network 1540, and smart thermostat hub 1512 may be configured to provide at least some connectivity between the resident's network (e.g., public wireless network 1540) and private wireless network 1530.

To facilitate communication between the two networks, smart thermostat hub 1512 may include a network bridge that is configured to communicatively couple private wireless network 1530 and public wireless network 1540, such that the two networks operate as a single connected wireless network. However, the network bridge (e.g., smart thermostat hub 1512) may also be configured to provide only controlled (e.g., limited) access to private wireless network 1530 by public wireless network 1540 (or devices thereof), in order to maintain the property manager's ownership and/or control of devices that are communicatively coupled to private wireless network 1530, such as smart lock 1514, smart light 1516, and smart thermostat hub 1512. This may modify the normal operation of a Matter-compliant or Thread-compliant network, in which any user of device with access to the network has full permissions with respect to other devices of the network, such that a smart assistant connected to public wireless network 1540 would be able to cause smart lock 1514 to be removed from, and lose access to, private wireless network 1530 if public wireless network 1540 and private wireless network 1530 were bridged to form a single Matter-compliant or Thread-compliant wireless network. To prevent such actions from occurring, smart thermostat hub 1512 may be configured to filter or otherwise limit access to devices of private wireless network 1530 by devices of public wireless network 1540 even though public wireless network 1540 and private wireless network 1530 are otherwise operated as a single wireless network. For example, smart thermostat hub 1512 may provide less than full permissions to devices or users of public wireless network 1540 as compared to devices or users of private wireless network 1530.

The less than full access permissions provided by smart thermostat hub 1512 to devices or users of public wireless network 1540 may permit requests for status, control of selected device functionality, or a combination thereof, but not permit (e.g., prohibit) changes to device access settings, device ownership settings, other similar settings, or a combination thereof. Stated another way, smart thermostat hub 1512 may not permit devices or users of public wireless network 1540 to perform administrator level or "admin" level commands, or other high level commands, that are capable of changing device access settings, device ownership settings, other similar settings, or a combination thereof. However, smart thermostat hub 1512 may be configured to support requests from devices of public wireless network 1540, such as user device 140, to perform operations or request information that is associated with lower-level command levels that are less than administrator level (e.g., administrator permission). Non-limiting examples of such permitted operations (e.g., operations associated with non-administrator level) include modifying a thermostat setting of smart thermostat hub 1512, retrieving log data from smart lock 1514 or modifying a locked state of smart lock 1514, changing a power state or other operational setting of smart light 1516, or viewing footage recorded by a wireless or IoT camera. Non-limiting examples of restricted operations (e.g., operations associated with administrator/admin level or higher) include restricting access or setting a master passcode for smart thermostat hub 1512 or smart lock 1514, deleting access credentials provided by server 130 to smart lock 1514, disconnecting smart thermostat hub 1512, smart lock 1514, or smart light 1516 from private wireless network 1530, or the like, by communicating with the property management platform hosted by server 130. To prevent improper operations, smart thermostat hub 1512 may only permit communication from public wireless network 1540 to a device of private wireless network 1530 if the permissions required for the communication fail to exceed a threshold (e.g., the communication corresponds to an operation that is permitted by devices or users of public wireless network 1540). In some implementations, control of, and communication with, smart lock 1514 and the thermostat of smart thermostat hub 1512 may be performed by server 130 communicating with smart thermostat hub 1512 via LPWAN network 1550, and communication with and control of other smart devices, such as smart light 1516, may be performed by server 130 communicating with smart thermostat hub 1512 via public wireless network 1540. Additional details of an illustrative network bridge are described further below, with reference to FIG. 16. As can be appreciated, such operations may prevent the property manager from accessing their provided devices and should be prevented to maintain the control and ownership of such devices. In some implementations, private wireless network 1530 and public wireless network 1540 are both Matter-compliant networks, and smart thermostat hub 1512 may be configured to bridge the two networks in such a manner that all devices on public wireless network 1540 except for smart thermostat hub 1512 have administrator privileges with respect to other devices and are able to view and interact with smart thermostat hub 1512 and devices of private wireless network 1530 as though these devices are part of a single Matter-complaint network without having the same privileges with respect to devices of private wireless network 1530.

In addition to providing a bridge between private wireless network 1530 and public wireless network 1540, smart thermostat hub 1512 may be configured to receive control information from server 130, such as via LPWAN network 1550, and to provide corresponding instructions or other communications to smart devices of private wireless network 1530 based on the control information. In an example, control information that identifies smart lock 1514 and an unlock command may be received by smart thermostat hub 1512 from server 130 (e.g., either via LPWAN network 1550 or public wireless network 1540), and smart thermostat hub 1512 may generate and transmit an unlock command to smart lock 1514 via private wireless network 1530. As another example, control information that identifies smart light 1516 and a lighting setting may be received by smart thermostat hub 1512 from server 130 (e.g., either via LPWAN network 1550 or public wireless network 1540), and smart thermostat hub 1512 may generate and transmit a command to smart light 1516 via private wireless network 1530 to cause smart light 1516 to set a power level based on the lighting setting. Other examples of operations are described above with reference to FIGS. 1-14. In another example, secure messages and notifications relating to an operating status or one or more operating settings of a smart device associated with unit 1510 may be transmitted from smart thermostat hub 1512 over LPWAN network 1550, or alternatively over public wireless network 1540, and displayed via a graphical user interface (GUI) of a property management application executable at server 130, as will be described in further detail below with respect to FIG. 18. In yet another example, secure messages and notifications relating to an operating status or one or more operating settings of a smart device associated with unit 1510 may be transmitted from smart thermostat hub 1512 over LPWAN network 1550, or alternatively over public wireless network 1540, and displayed via a GUI of a client or mobile application executable at user device(s) 140, as will be described in further detail below with respect to FIG. 17.

In some implementations, smart thermostat hub 1512 may be configured to support one or more device or network reset or "wipe" operations in order to ready unit 1510 for rental after a resident moves out. For example, after a previous resident moves out (and optionally takes the infrastructure of public wireless network 1540, smart TV 1518, smart speaker 1520, and/or smart light 1522 with them), smart thermostat hub 1512 may receive a reconfigure command from server 130 via LPWAN network 1550. Based on receiving the reconfigure command, smart thermostat hub 1512 may send signaling or instructions to smart lock 1514 and smart light 1516 to delete any settings made by the previous resident from the devices, to delete any identification information associated with the previous resident or the previous resident's devices, to reset one or more settings of the devices to initial or default settings, to reconfigure private wireless network 1530 such that it is no longer communicatively coupled to any other devices via public wireless network 1540, other reconfiguration operations, or a combination thereof. Supporting such reconfiguration commands and operations may enable the property manager to return smart devices that remain in unit 1510 after the previous resident has moved out, such as smart thermostat hub 1512, smart lock 1514, and smart light 1516, to initialized settings that enable the devices to be connected to new devices via public wireless network 1540 when a new resident moves in and connects such new devices. This remote controlled reconfiguration may save substantial time and costs as compared to having an employee or agent of the property manager go to unit 1510 in person to manually reconfigure or set the remaining smart devices and private wireless network 1530 each time a resident moves out of unit 1510, thereby providing significant benefit to a property manager of a multi-family residential property.

Figure 16:
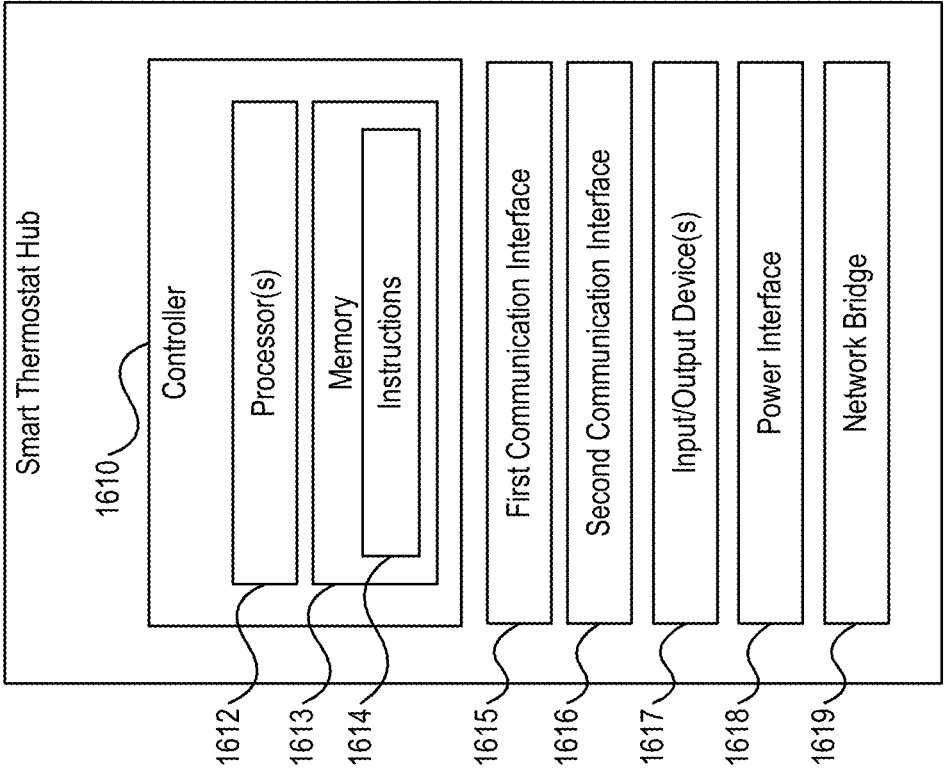
FIG. 16 is a block diagram of a smart thermostat hub that supports a private wireless network and a public wireless network in accordance with embodiments of the present disclosure.

FIG. 16 is a block diagram of an illustrative smart thermostat hub 1600 that supports a private wireless network and a public wireless network in accordance with embodiments of the present disclosure. For discussion purposes, smart thermostat hub 1600 will be described with reference to various components of system 1400 of FIG. 14 or system 1500 of FIG. 15, but smart thermostat hub 1600 is not intended to be limited thereto. As shown in FIG. 16, smart thermostat hub 1600 includes smart hub controller 1610, one or more processors 1612, memory 1613, instructions 1614, I/O devices 1617, and a power interface 1618, as described above with reference to FIGS. 2 and 3. Power interface 1618 is optional and may be omitted from smart thermostat hub 1600 in some implementations. However, smart thermostat hub 1600 of FIG. 16 also includes a first communication interface 1615, a second communication interface 1616, and optionally a network bridge 1619. First communication interface 1615 may be configured to communicatively couple controller 1610 to a property management platform (e.g., server 130 of FIG. 14) via a LPWAN network (e.g., LPWAN network 1450 of FIG. 14), such as a LoRaWAN network, an NB-IoT network, a Sigfox network, a Weightless network, a DASH7 network, a Wize network, a CSS network, a MIoTy network, an IEEE 802.11ah network, or the like. The LPWAN network may also include a low power cellular network or low power cellular communication link, such as a LTE-M network or a LTE-MTC network. As such, first communication interface 1615 may be configured to communicate via a LPWAN-based communication link, such as a LoRaWAN communication link, an NB-IoT communication link, a Sigfox-based communication link, a Weightless communication link, a LTE-M or LTE-MTC communication link, a DASH7 communication link, a Wize communication link, a CSS-based communication link, a MIoTy communication link, an IEEE 802.11ah communication link, or the like. In some alternate implementations, first communication interface 1615 is configured to communicate with the property management server via a cellular communication link, such as a 4G communication link, a 4G LTE communication link, a 5G communication link, or the like. Second communication interface 1616 may be configured to communicatively couple controller 1610 to one or more smart devices (e.g., smart lock 1414 or smart light 1416 of FIG. 15) via a Wi-Fi network or a short-range wireless communication network, such as a Zigbee network, a Z-Wave network, a Bluetooth network, a BLE network, a Matter network (e.g., the wireless network is compliant with a Matter communication protocol), a Thread network (e.g., the wireless network is compliant with a Thread communication protocol), or the like. As such, second communication interface 1616 may be configured to communicate via a Zigbee communication link, a Z-Wave communication link, a Bluetooth communication link, a BLE communication link, a Matter-compliant communication link, a Thread-compliant communication link, another type of short-range communication link, or a combination thereof. The wireless network supported by second communication interface 1616 may be configured as a private network under control of a property manager through operation of smart thermostat hub 1600 and which only controlled or limited access is provided to outside, public wireless network(s), as further described below. Although described, and illustrated in FIG. 16, as separate communication interfaces, in some other implementations, smart thermostat hub 1600 may include a single communication interface that is configured to communicate via multiple types of wireless communication links (e.g., a LPWAN communication link or other long-range communication link and a short-range/WPAN communication link). In such examples, the single communication interface may be configured to communicate with the property management platform via the LPWAN according to a first protocol (e.g., an LPWAN protocol) and using a first set of access credentials in addition to being configured to communicate with smart devices via the short-range wireless network according to a second protocol (e.g., a short-range protocol) and using a second set of access credentials.

In implementations in which smart thermostat hub 1600 includes network bridge 1619, network bridge 1619 may be configured to communicatively couple the private network (e.g., private wireless network 1530 of FIG. 15) supported by second communication interface 1616 to a public wireless network (e.g., public wireless network 1540 of FIG. 15), such as by aggregating the private wireless network and the public wireless network into a single logical wireless network. However, in addition to connecting the wireless networks, network bridge 1619 may be configured to provide controlled (e.g., limited) access of the private wireless network to the public wireless network. For example, network bridge 1619 and controller 1610 may be filter or otherwise manage requests from the public wireless network for operations at, or information from, devices of the private wireless network. In this manner, smart thermostat hub 1600 may provide connectivity between multiple networks, including wireless network(s) (e.g., a public wireless network) provided by a resident of a multi-family residential property, without providing full privileges or access to smart devices that are owned by the property manager and intended to remain installed in the unit after the resident moves out.

In some implementations, network bridge 1619 may filter requests from the public wireless network, such as from a user device of a resident, based on a command level associated with the request and a threshold level. To illustrate, each request received from the private wireless network may be associated with a command level that indicates a permissions level or strength of the operation being requested, and network bridge 1619 may identify the command levels and provide the command levels to controller 1610 for filtering decisions. For example, network bridge 1619 may receive a request from the user device, via the public wireless network, for performance at a smart door lock (e.g., smart lock 1514 of FIG. 15), and network bridge 1619 may identify the command level and provide the command level and the request to controller 1610 (e.g., one or more processors 1612) for processing. Controller 1610 may compare the command level or the required permissions associated with the received request to a threshold level (e.g., maximum permissions granted to devices of a public network), and if the command level or permissions are less than the threshold level, controller 1610 may generate a command for transmission to the smart door lock to perform the requested operation. However, if the command level or permissions are equal to or greater than the threshold level, the requested command may represent an operation that will give the resident control of the smart door lock or otherwise disrupt the property manager's control or ownership of the smart door lock, and therefore controller 1610 may not allow performance of the requested operation. This may prevent devices or users of the public wireless network from wiping or removing from the private network one or more smart devices that are deployed by the property manager. Additionally or alternatively, network bridge 1619 and controller 1610 may filter or process requests using other techniques, such as rule-based command analysis or using trained machine learning logic to filter requested commands that should not be performed at smart devices of the private wireless network. Although described above as network bridge 1619 providing wireless network connections and aggregation, and controller 1610 providing the request filtering and processing, in other implementations, network bridge 1619 may include circuitry, microprocessors, logic, or the like, to enable network bridge 1619 to perform both the network connectivity and aggregation functionality and the request processing and analysis functionality.

In some implementations, network bridge 1619 is included in or integrated within smart thermostat hub 1600 such that network bridge 1619 is not removable. For example, smart thermostat hub 1600 may include a housing that encloses one or more processors 1612, memory 1613, first communication interface 1615, second communication interface 1616, optionally I/O devices 1617, power interface 1618, and network bridge 1619. In such an example, network bridge 1619 may be soldered to a circuit board of smart thermostat hub 1600 or otherwise non-removably coupled to smart thermostat hub 1600 such that it cannot be removed by a resident of the unit. In some other implementations, network bridge 1619 is a modular component that is removably coupled to smart thermostat hub 1600. For example, smart thermostat hub 1600 may include an interface that includes one or more pins, and network bridge 1619 may include an interface that includes a connector configured to couple to the one or more pins. Alternatively, network bridge may include an interface that includes one or more pins and smart thermostat hub 1600 may include a connector configured to couple to the one or more pins. Other types of removable couplings are possible such that network bridge 1619 may be coupled to smart thermostat hub 1600 to form a modular unit for supporting a private wireless network and a public wireless network. Such a modular design may enable a multi-family residential property to be incrementally upgraded to include support for multiple wireless networks, similar to as described above with reference to FIG. 4 for upgrading smart thermostats with smart hub components.

In addition to providing network bridging and controlled network connectivity functionality, smart thermostat hub 1600 may be configured to provide functionality to receive control information (e.g., from server 130 of FIG. 14) and to generate and transmit instructions or signaling to smart devices to perform requested operations. For example, controller 1610 may be configured to receive control information that includes identification of one or more smart devices and indication of one or more commands, and controller 1610 may be configured to generate and transmit instructions or signaling to cause performance of the indicated one or more commands to the identified one or more smart devices. Additionally, or alternatively, controller 1610 may be configured to implement a smart hub controller and a HVAC controller. In some such implementations, the smart hub controller is configured to communicate with and control smart devices via the private wireless network, and the HVAC controller is configured to control HVAC operations for the unit of the multi-family residential property, as described above with reference to FIG. 2.

Figure 17:
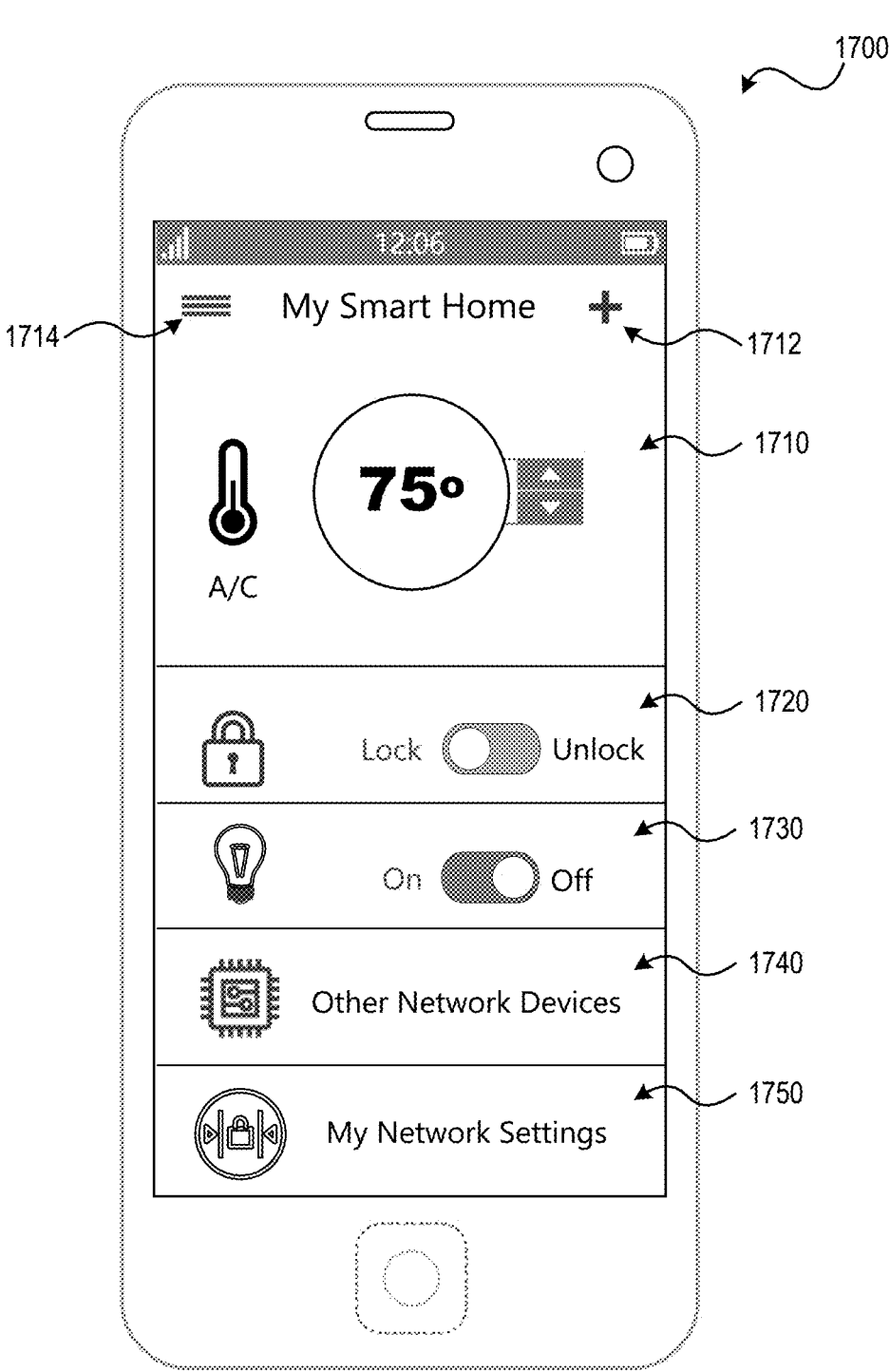
FIG. 17 is an exemplary graphical user interface (GUI) of a mobile application for providing smart device access control features and network configuration features to a mobile device user in accordance with embodiments of the present disclosure.

FIG. 17 shows an example of a GUI 1700 of a mobile application for providing a user (e.g., a resident of unit 1410 of FIG. 14) of a mobile device (e.g., user device 140 of FIG. 14) with remote access and control features for smart devices and network configuration features in accordance with embodiments of the present disclosure. GUI 1700 may be used by the resident to determine a current operating status as well as to change the operating settings of the various smart devices (e.g., the smart thermostat coupled to smart thermostat hub 1412, smart lock 1414, and smart light 1416 of FIG. 14) installed at the resident's apartment unit and connected to a wireless network (e.g., second wireless network 1430 of FIG. 14 or private wireless network 1530 of FIG. 15) that is established by a property manager or owner of the resident's apartment unit, as well as smart devices (e.g., smart TV 1418, smart speaker 1420, and smart light 1422 of FIG. 14) or other network devices connected to a wireless network (e.g., first wireless network 1440 of FIG. 14 or public wireless network 1540 of FIG. 15) and network configurations of the wireless networks. As shown in FIG. 17, GUI 1700 includes separate control panels 1710, 1720, and 1730 corresponding to the various smart devices owned or controlled by the property manager, control panel 1740 corresponding to the resident's networked devices, and control panel 1750 corresponding to network settings. Control panel 1710 allows the resident to view the smart thermostat's current temperature setting and adjust the temperature, e.g., by using control buttons to increase or decrease the temperature. Control panel 1720 allows the resident to view the lock status of the smart lock and provides a slider control to either lock or unlock the smart lock. In some implementations, control panel 1720 may also include button(s) or other interactive component(s) that allow the resident to view users who have access credentials stored at the smart lock or to retrieve a log from the smart lock. Control panel 1730 allows the resident to view the status of the smart light and provides a slider control to turn on or off the smart light. Control panel 1740 allows the resident to view the smart devices connected to their public wireless network and control one or more operational settings, such as changing a channel of a smart tv, viewing video from a video door bell, providing a voice command to a smart assistant, or the like. Control panel 1750 allows the resident to view the smart devices connected to both of the wireless networks (e.g., the private wireless network and the public wireless network, viewed as a single wireless environment), and optionally add or remove smart devices from the public wireless network or otherwise configure the public wireless network (e.g., by setting security credentials, wireless channels, a device limit, etc.). In some embodiments, GUI 1700 may include a control button 1712 that enables the resident to add new control panels for additional smart devices that are later installed at the apartment unit or added to the public wireless network. GUI 1700 may also include a settings button 1714 that allows the resident to access additional controls or settings (e.g., notification settings) associated with the smart devices or smart thermostat hub.

Figure 18:
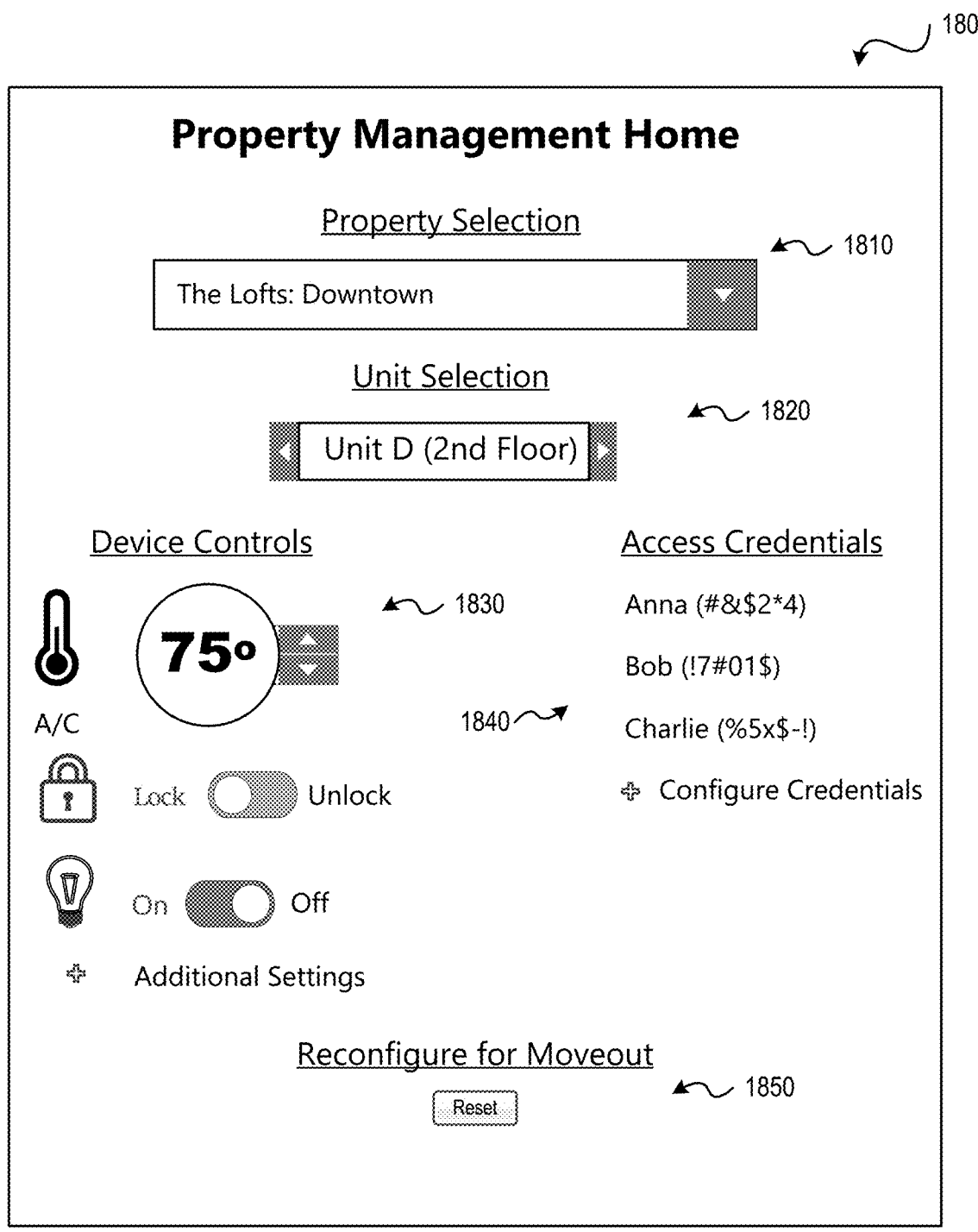
FIG. 18 is an exemplary GUI of an application for providing smart device access control features, credential management features for smart locks, and/or device reconfiguration features to a property management platform user in accordance with embodiments of the present disclosure.

FIG. 18 shows an example of a GUI 1800 of an application for providing a property manager of a property management platform (e.g., server 130 of FIG. 14 or FIG. 15, or a client device that communicates with server 130 to perform operations described herein) with remote access and control features for smart devices, credential management features for smart locks, device reconfiguration features for smart devices, or a combination thereof, in accordance with embodiments of the present disclosure.

GUI 1800 may be used by a property manager, or an employee of a property management company, to determine current operating statuses as well as to change the operating settings of the various smart devices (e.g., the smart thermostat coupled to or controlled by smart thermostat hub 1412, smart lock 1414, smart light 1416 of FIG. 14) installed at one or more apartment units (e.g., multi-family residential units) or properties. As shown in FIG. 18, GUI 1800 includes control panels 1810, 1820, 1830, 1840, and 1850 corresponding to the various aspects of property management. Although five separate control panels are shown in FIG. 18, in other embodiments, less than five or more than five control panels may be included in GUI 1800, and information in one or more of the control panels shown in FIG. 18 may instead by displayed in one or more other control panels. Control panel 1810 allows the property manager to select a property for which to view information and control elements. In some embodiments, control panel 1810 may include a dropdown button or other selectable element to enable selection of one or more properties associated with the property manager. Control panel 1820 allows the property manager to select a unit of the selected property for which to view status information and provide instructions for controlling aspects of smart devices or for reconfiguring smart devices or networks. In some embodiments, control panel 1820 may include arrow buttons or other selectable elements to enable selection of one or more units of the selected property. Although referred to as unit selection, control panel 1820 may also enable selection of non-unit areas, such as common areas and outdoor areas, that contain smart thermostat hub(s) and smart device(s).

In the example shown in FIG. 18, control panel 1830 allows the property manager to view a smart thermostat's current temperature setting and adjust the temperature, e.g., by using control buttons to increase or decrease the temperature. Control panel 1830 also allows the property manager to view the lock status of a smart lock and provides a slider control to either lock or unlock the smart lock. Control panel 1830 also allows the property manager to view the status of a smart light and provides a slider control to turn on or off the smart light. In some implementations, control panel 1830 may include an additional settings button that allows the property manager to access additional controls or settings, such as notification settings, scheduling settings, security settings, or the like, associated with the smart devices or smart thermostat hub in the selected unit of the selected property. Control panel 1840 allows the property manager to view the access credentials configured at a smart lock of the selected unit. In the example shown in FIG. 18, the access credentials are currently enabled: a first credential for first user (e.g., "Anna", as represented by the character string following Anna), a second credential for a second user (e.g., "Bob"), and a third credential for a third user (e.g., "Charlie"). Control panel 1840 may also include a configure credentials button that enables the property manager to configure the access credentials for the smart lock of the selected unit as further described above, such as by adding additional access credential(s) or by deleting or otherwise invalidating existing access credential(s).

Control panel 1850 allows the property manager to reconfigure (e.g., wipe) smart devices in the selected unit and re-initialize network settings for a private wireless network (e.g., private wireless network 1530 of FIG. 15). In some embodiments, control panel 1850 may provide a reset button to allow the property manager to reset or re-initialize settings of smart devices installed at the unit, such as smart door locks, the thermostat of a smart thermostat hub, smart lights that are provided by the property manager, or other smart devices that are provided and maintained by the property manager and that remain at the unit after a current resident has moved out. Resetting or re-initializing the settings may wipe any settings that were set by the resident, any user IDs or access information associated with the resident, any information associated with devices of the resident that were connected to a public wireless network that is connected to the private wireless network by a network bridge of a smart thermostat hub, other settings or information, or a combination thereof. To further illustrate, when a current resident is moving out of a unit, the resident may take any of their smart devices (e.g., smart TV 1418 and smart speaker 1420 of FIG. 14), as well as optionally hardware such as routers or other components of the resident's wireless network (e.g., the public wireless network). However, the remaining smart devices that are maintained by the property manager may be configured to communicate with the removed smart devices, via the removed wireless network, or otherwise store information that is not to be used with a new resident that moves in. To "wipe" the smart devices and reconfigure the unit for the new resident, the property manager may use the reset button in control panel 1850 to cause a property management server (e.g., server 130 of FIG. 14) to transmit instructions via the LPWAN backhaul to the smart thermostat hub in the unit for distribution to the smart devices to cause the smart devices to delete any such information or otherwise return to an initial configuration in which they are ready to be used by a new resident, either via an application executed at a user device (e.g., GUI 1700 of FIG. 17) or by connecting the new resident's smart devices and network hardware to create a new public wireless network within the unit.

FIG. 19 is a flowchart of an exemplary process 1900 for controlling or managing smart devices within a unit of a multi-family residential property. Process 1900 may be performed by one or more processors of a smart thermostat hub, such as smart thermostat hub 1412 of FIG. 14, smart thermostat hub 1512 of FIG. 15, or smart thermostat hub 1600 of FIG. 16. Process 1900 begins at block 1910, which includes receiving, by the smart thermostat hub in a unit of a multi-family residential property, an initialization instruction from a property management platform via a LPWAN communication link (e.g., LPWAN network 1450 of FIG. 14).

At block 1920, the smart thermostat hub may initialize, based on the initialization instruction, a connection between the smart thermostat hub and the property management platform via a first wireless network that is communicatively coupled to the smart thermostat hub via a first wireless communication link. For example, the first wireless network (e.g., first wireless network 1440 of FIG. 14) may be located at the unit and communicatively coupled to a first set of one or more smart devices (e.g., smart TV 1418, smart speaker 1420, and smart light 1422 of FIG. 14). The first set of one or more smart devices may include smart devices brought by a resident, and the first wireless network may be implemented using infrastructure (e.g., a router, cables, etc.) owned by the resident or installed by the property manager, such as at Class A properties. For example, the first wireless network may be a Wi-Fi network, or a network that is compliant with a Matter communication protocol or a Thread communication protocol, as non-limiting examples.

At block 1930, the smart thermostat hub receives control information from the property management platform via the first wireless network. For example, after establishing the connection to the property management platform via the first wireless network (e.g., a resident's Wi-Fi network), the smart thermostat hub may use the first wireless network as a backhaul connection to the property management platform to exchange data for controlling and managing smart devices within the unit. The control information may be associated with a smart device (e.g., smart light 1422 of FIG. 14) of the first set of smart devices, and the control information may indicate an operation to be performed by the smart device.

At block 1940, the smart thermostat hub may transmit a command that is based on the control information to the smart device via the first wireless network. For example, smart thermostat hub 1412 may transmit a command based on control information to smart light 1422 via first wireless network 1440 of FIG. 14. In some implementations, the smart thermostat hub may also be communicatively coupled to a second wireless network (e.g., second wireless network 1430 of FIG. 14) that includes a second set of one or more smart devices (e.g., smart lock 1414 and smart light 1416 of FIG. 14). The second wireless network may be a short-range wireless network (e.g., a Bluetooth network, a BLE network, a Zigbee network, a Z-Wave network, etc.), a Wi-Fi network, a Matter-compliant network, a Thread-compliant network, or another type of wireless network. In some such implementations, the second wireless network and the first wireless network may be a same type of wireless network (e.g., may use a same wireless communication protocol).

In some implementations, the first wireless network is a public wireless network, and the second wireless network is a private wireless network, as described above with reference to FIG. 15. The private wireless network may be managed by the smart thermostat hub (e.g., network bridge 1619 of FIG. 16) and may devices of the public wireless network may be given limited access to the devices of the private wireless network by the smart thermostat hub. For example, if smart thermostat hub 1512 determines that a received request corresponds to an action that is permitted by users of public wireless network 1540, smart thermostat hub 1512 may transmit a command based on the request to smart lock 1514 or smart light 1516. In some implementations, devices of the public wireless network may be given limited permissions (e.g., less than full permissions) that do not include the capability to perform administrator level command (e.g., non-administrator level commands may be permitted by the smart thermostat hub to be provided to smart devices of the private wireless network).

Although the embodiments of the present disclosure and their advantages have been described in detail, it should be understood that various changes, substitutions and alterations can be made herein without departing from the spirit and scope of the disclosure as defined by the appended claims. It should be noted that although the descriptions provided above with respect to FIGS. 1-19 have been described with reference to multi-family residential properties, embodiments of the present disclosure may be readily applied to other types of properties, such as commercial properties (e.g., office spaces, warehouses, storage units, malls, and the like). Accordingly, it is to be understood that embodiments of the present disclosure are not limited to use with multi-family residential properties. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A system for controlling smart devices within a unit of a multi-family residential property, the system comprising:
   a smart thermostat hub comprising:
      one or more processors;
      a memory coupled to the one or more processors;
      a first communication interface configured to communicatively couple the smart thermostat hub to a property management platform via a low-power, wide area network (LPWAN) communication link; and
      a second communication interface configured to communicatively couple the smart thermostat hub to a first wireless network located at the unit via a first wireless communication link,
   wherein the first wireless network is communicatively coupled to a first set of one or more smart devices, and
   wherein the one or more processors are configured to:
      initialize a connection between the second communication interface and the property management platform via the first wireless network;
      receive, from the property management platform via the first wireless communication link, control information associated with a smart device of the first set of one or more smart devices; and
      transmit, to the smart device via the first wireless communication link, a command based on the control information.

2. The system of claim 1, wherein the first wireless network comprises a Wi-Fi network.

3. The system of claim 1, wherein the first wireless network is compliant with a Matter communication protocol or a Thread communication protocol.

4. The system of claim 1, wherein the first set of one or more smart devices includes one or more smart lights, one or more smart televisions (TVs), one or more smart speakers, one or more smart assistants, one or more cameras, or a combination thereof.

5. The system of claim 1, wherein the one or more processors are further configured to implement a smart hub controller and a heating, ventilation, and air conditioning (HVAC) controller, the smart hub controller configured to control at least one of the first set of one or more smart devices, the HVAC controller configured to control HVAC operations for the unit.

6. The system of claim 1, wherein the second communication interface is configured to communicatively couple the smart thermostat hub to a second wireless network located at the unit via a second wireless communication link, the second wireless network communicatively coupled to a second set of one or more smart devices.

7. The system of claim 6, wherein the second wireless network is compliant with a Matter communication protocol or a Thread communication protocol or wherein the second wireless network comprises a Wi-Fi network, a Bluetooth network, a Bluetooth Low Energy (BLE) network, a Zigbee network, or a Z-wave network.

8. The system of claim 6, wherein the one or more processors are further configured to:
   receive, from the property management platform via the LPWAN communication link, control information associated with a smart door lock that is included in the second wireless network; and
   transmit, to the smart door lock via the second wireless communication link, a command to modify access credential data stored at the smart door lock based on the control information.

9. The system of claim 6, wherein the smart thermostat hub further comprises:
   a network bridge configured to communicatively couple the second wireless network to the first wireless network and to provide controlled access of the second wireless network to the first wireless network, wherein the first wireless network comprises a public wireless network, and wherein the second wireless network comprises a private wireless network managed by the smart thermostat hub.

10. The system of claim 9, wherein the network bridge is configured to provide the controlled access of the second wireless network by providing less than full permissions to devices of the first wireless network, wherein the less than full permissions permit requests for status, control of selected device functionality, or a combination thereof and does not permit changes to device access settings, device ownership settings, or a combination thereof.

11. The system of claim 9, wherein the network bridge comprises a modular component that is configured to be removably coupled to the smart thermostat hub.

12. The system of claim 1, wherein the smart thermostat hub further comprises a housing that encloses the one or more processors, the memory, the first communication interface, and the second communication interface.

13. The system of claim 12, wherein the housing further encloses a network bridge configured to couple the first wireless network to a second wireless network, and wherein the first wireless network or the second wireless network is a private wireless network.

14. The system of claim 1, wherein the first communication interface is configured to communicatively couple the smart thermostat hub to a LPWAN gateway which is communicatively coupled to the property management platform.

15. A method for controlling smart devices within a unit of a multi-family residential property, the method comprising:
   receiving, by one or more processors of a smart thermostat hub, an initialization instruction from a property management platform via a low-power, wide area network (LPWAN) communication link;
   initializing, by the one or more processors and based on the initialization instruction, a connection between the smart thermostat hub and the property management platform via a first wireless network communicatively coupled to the smart thermostat hub via a first wireless communication link, the first wireless network located at the unit and communicatively coupled to a first set of one or more smart devices;
   receiving, by the one or more processors, control information from the property management platform via the first wireless network, the control information associated with a smart device of the first set of one or more smart devices; and
   transmitting, by the one or more processors, a command that is based on the control information to the smart device via the first wireless network.

16. The method of claim 15, wherein the smart thermostat hub is communicatively coupled to a second wireless network by a second wireless communication link, and wherein the second wireless network is communicatively coupled to a second set of one or more smart devices.

17. The method of claim 16, wherein the first wireless network, the second wireless network, or both, comprise a Wi-Fi network, a Matter communication protocol-compliant network, a Thread communication protocol-compliant network, a Bluetooth network, a Bluetooth Low Energy (BLE) network, a Zigbee network, or a Z-wave network.

18. The method of claim 16, wherein the LPWAN communication link comprises a Long Range (LoRa) wide area network (LoRaWAN) communication link or a low power cellular communication link.

19. The method of claim 16, wherein the second set of one or more smart devices include one or more smart door locks, one or more smart lights, one or more cameras, or a combination thereof, that are associated with a property manager of the multi-family residential property.

20. The method of claim 16, further comprising:
   receiving, by the one or more processors, a request associated with a smart device of the second set of one or more smart devices from the first wireless network, wherein the smart thermostat hub includes a network bridge configured to provide controlled access of the second wireless network to the first wireless network, and wherein the first wireless network comprises a public network and the second wireless network comprises a private network managed by a property manager of the unit; and
   transmitting, by the one or more processors, a command to the smart device based on the control information failing to exceed permissions associated with the first wireless network.

* * * * *